United States Patent
Imai et al.

(10) Patent No.: US 9,846,236 B2
(45) Date of Patent: Dec. 19, 2017

(54) OPTICAL SCANNER, OBJECT DETECTOR, AND SENSING APPARATUS

(71) Applicants: Shigeaki Imai, Kanagawa (JP); Masataka Uehira, Kanagawa (JP); Kohji Sakai, Tokyo (JP); Tadashi Nakamura, Tokyo (JP); Yukio Itami, Kanagawa (JP)

(72) Inventors: Shigeaki Imai, Kanagawa (JP); Masataka Uehira, Kanagawa (JP); Kohji Sakai, Tokyo (JP); Tadashi Nakamura, Tokyo (JP); Yukio Itami, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 189 days.

(21) Appl. No.: 14/813,321

(22) Filed: Jul. 30, 2015

(65) Prior Publication Data
US 2016/0061955 A1 Mar. 3, 2016

(30) Foreign Application Priority Data
Aug. 28, 2014 (JP) .................................. 2014-173593

(51) Int. Cl.
*G01S 3/08* (2006.01)
*G01S 17/93* (2006.01)
(Continued)

(52) U.S. Cl.
CPC ............ *G01S 17/936* (2013.01); *G01S 7/484* (2013.01); *G01S 7/4817* (2013.01); *G01S 17/10* (2013.01); *G01S 17/42* (2013.01); *G01S 17/58* (2013.01)

(58) Field of Classification Search
CPC ...... G01S 17/936; G01S 7/4817; G01S 7/484; G01S 17/10; G01S 17/42; G01S 17/58
See application file for complete search history.

(56) References Cited

U.S. PATENT DOCUMENTS 5,565,870 A * 10/1996 Fukuhara .............. G01S 7/2926
342/70
2008/0068584 A1* 3/2008 Mori ....................... G01S 17/10
356/5.01
(Continued)

FOREIGN PATENT DOCUMENTS

JP 2006-215483 8/2006
JP 2009-063339 3/2009
(Continued)

OTHER PUBLICATIONS

U.S. Appl. No. 14/658,650, filed Mar. 16, 2015.
U.S. Appl. No. 14/658,541, filed Mar. 16, 2015.

*Primary Examiner* — Samantha K Abraham
(74) *Attorney, Agent, or Firm* — Oblon, McClelland, Maier & Neustadt, L.L.P.

(57) ABSTRACT

An optical scanner is provided including a light source configured to emit light, a light source driving device configured to drive the light source, a light deflector having at least one rotating reflection plane and configured to deflect the light emitted from the light source to a scanning area, and a light detector configured to output a signal to control a timing at which scanning of the scanning area by the light deflected by the light deflector starts, where the light detector and the scanning area are sequentially scanned in a single scanning by one reflection plane of the light deflector, and the light source driving device drives the light source using a first driving method when the light scans the light detector, and drives the light source using a second driving method that is different from the first driving method when the light scans the scanning area.

14 Claims, 21 Drawing Sheets

(51) Int. Cl.
*G01S 17/58* (2006.01)
*G01S 17/10* (2006.01)
*G01S 17/42* (2006.01)
*G01S 7/481* (2006.01)
*G01S 7/484* (2006.01)

(56) References Cited

U.S. PATENT DOCUMENTS

| | | |
|---|---|---|
| 2009/0108173 A1* | 4/2009 | Kakui .................. B23K 26/03 250/202 |
| 2014/0009747 A1 | 1/2014 | Suzuki et al. |
| 2014/0034817 A1 | 2/2014 | Nakamura et al. |
| 2014/0036071 A1 | 2/2014 | Nakamura et al. |
| 2014/0209793 A1 | 7/2014 | Nakamura et al. |
| 2015/0124238 A1 | 5/2015 | Sakai et al. |
| 2015/0160341 A1 | 6/2015 | Akatsu et al. |
| 2015/0204977 A1 | 7/2015 | Sakai |

FOREIGN PATENT DOCUMENTS

| | | |
|---|---|---|
| JP | 2009-069003 | 4/2009 |
| JP | 2011-085577 | 4/2011 |
| JP | 2011-128112 | 6/2011 |
| JP | 2012-107984 | 6/2012 |

\* cited by examiner

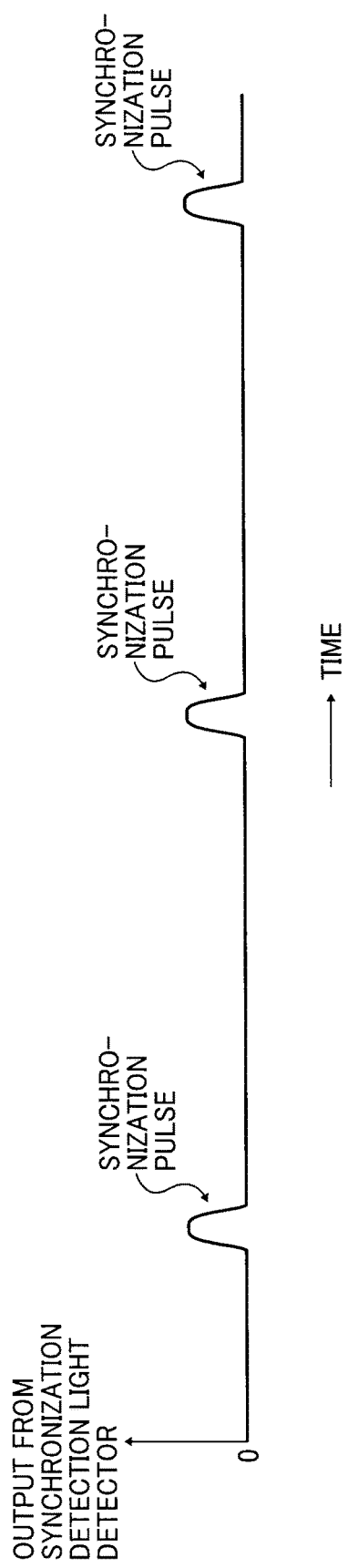

OPTICAL SCANNER, OBJECT DETECTOR, AND SENSING APPARATUS

CROSS-REFERENCE TO RELATED APPLICATION

This patent application is based on and claims priority pursuant to 35 U.S.C. §119(a) to Japanese Patent Application No. 2014-173593, filed on Aug. 28, 2014, in the Japan Patent Office, the entire disclosure of which is hereby incorporated by reference herein.

BACKGROUND

Technical Field

Embodiments of the present invention relate to an optical scanner, an object detector, and a sensing apparatus.

Background Art

Currently, object detectors that detect the presence of an object or the distance to the object are being developed.

Moreover, optical scanners that detect the scanning position of a light beam with high accuracy are known.

However, it has proven difficult for conventional devices to combine compactness and good detection accuracy.

SUMMARY

Embodiments of the present invention described herein provide an optical scanner including a light source configured to emit light, a light source driving device configured to drive the light source, a light deflector having at least one rotating reflection plane and configured to deflect the light emitted from the light source to a scanning area, and a light detector configured to output a signal to control a timing at which scanning of the scanning area by the light deflected by the light deflector starts. In the optical scanner, the light detector and the scanning area are sequentially scanned in a single scanning by one of the at least one rotating reflection plane of the light deflector, and the light source driving device drives the light source using a first driving method when the light deflected by the light deflector scans the light detector, and drives the light source using a second driving method that is different from the first driving method when the light deflected by the light deflector scans the scanning area.

BRIEF DESCRIPTION OF THE DRAWINGS

A more complete appreciation of exemplary embodiments and the many attendant advantages thereof will be readily obtained as the same becomes better understood by reference to the following detailed description when considered in connection with the accompanying drawings.

FIG. 16 is a diagram illustrating a synchronization detection signal according to an embodiment of the present application.

Figure 1:
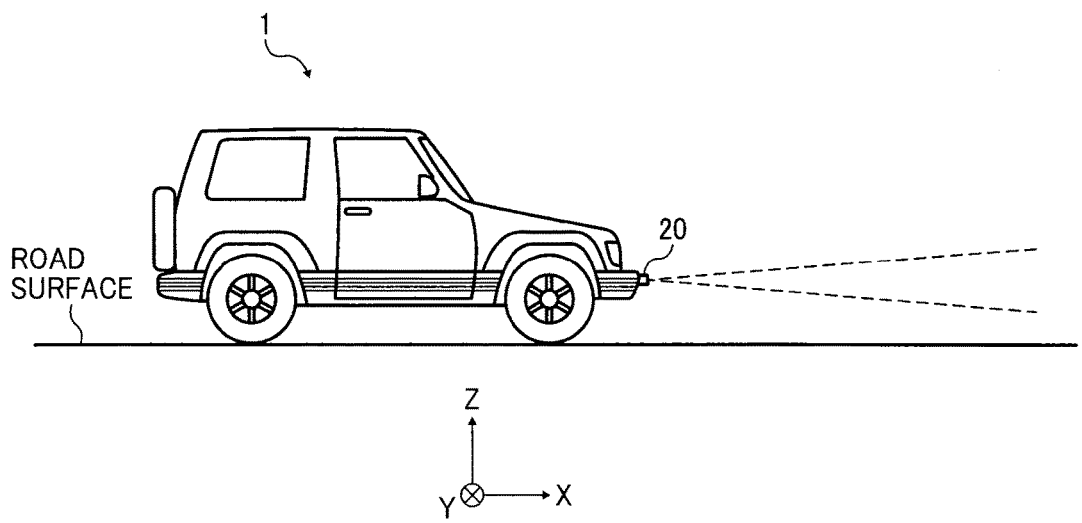
FIG. 1 is a diagram illustrating the external appearance of a vehicle for which a laser radar is provided, according to an embodiment of the present invention.

The accompanying drawings are intended to depict exemplary embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing embodiments shown in the drawings, specific terminology is employed for the sake of clarity. However, the present disclosure is not intended to be limited to the specific terminology so selected and it is to be understood that each specific element includes all technical equivalents that have the same structure, operate in a similar manner, and achieve a similar result.

Embodiments of the present invention are described with reference to FIG. 1 to FIG. 27.

FIG. 1 illustrates the external appearance of a vehicle 1 for which a laser radar 20 is provided as an object detector, according to an embodiment of the present invention.

In the present embodiment, the laser radar 20 is fitted, for example, to a portion near the license plate at the front of the vehicle 1. In the XYZ three-dimensional orthogonal coordinate system according to the present embodiment, it is assumed that the direction orthogonal to the road surface is a Z-axis direction, and that the traveling direction of the vehicle 1 is the +X direction. The area in which the laser radar 20 can detect an object may be referred to as "detection area" in the following description.

Figure 2:
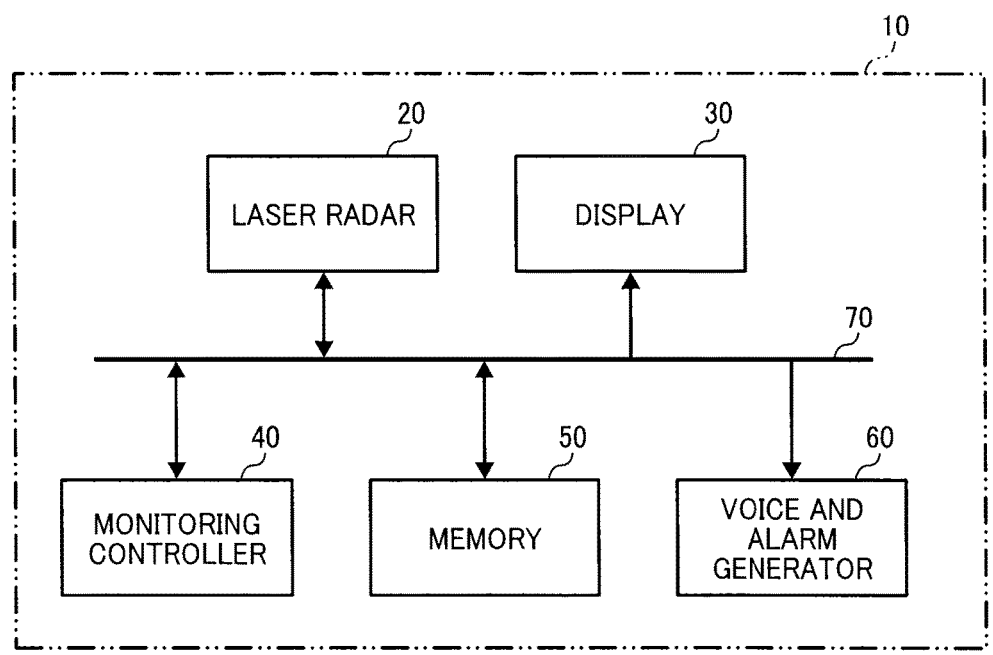
FIG. 2 is a block diagram of an application of a monitoring apparatus according to an embodiment of the present invention.

FIG. 2 is a block diagram of the configuration of a monitoring apparatus 10 according to the present embodiment. In the vehicle 1, as depicted in FIG. 2 for example, a display 30, a monitoring controller 40, a memory 50, and a voice and alarm generator 60 are provided. These elements are electrically connected to each other through a bus 70 through which data can be transmitted.

In the present embodiment, the monitoring apparatus 10 that serves as a sensing apparatus includes the laser radar 20, the display 30, the monitoring controller 40, the memory 50, and the voice and alarm generator 60. The monitoring apparatus 10 is fitted to the vehicle 1. More specifically, the monitoring apparatus 10 is electrically connected to the main controller of the vehicle 1.

Figure 3:
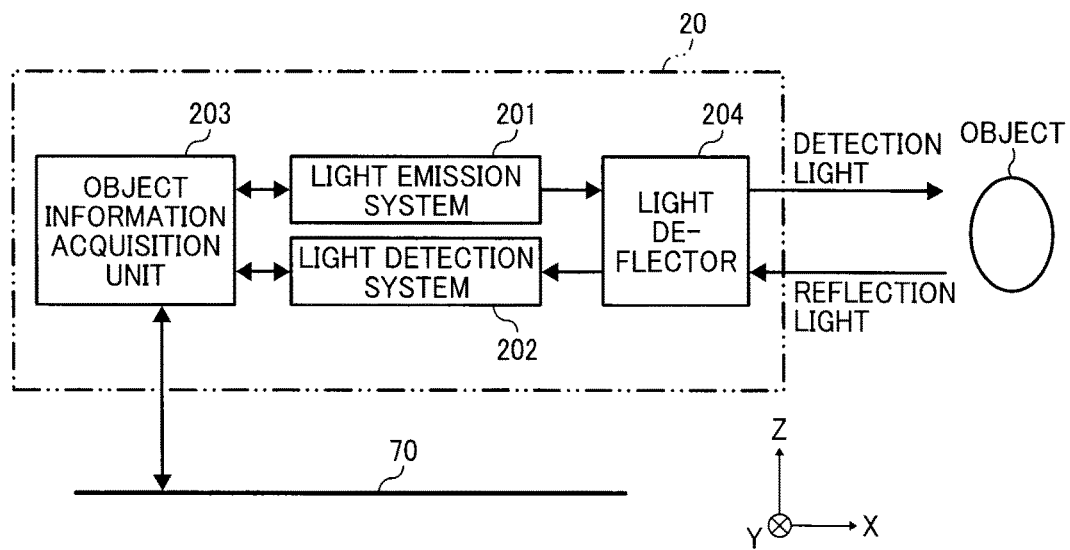
FIG. 3 is a diagram illustrating the configuration of a laser radar according to an embodiment of the present invention.

FIG. 3 is a block diagram of the configuration of the laser radar 20 according to the present embodiment. As illustrated in FIG. 3 for example, the laser radar 20 includes a light emission system 201, a light reflector 204, a light detection system 202, an object information acquisition unit 203, and a reflecting mirror 205 (hidden by the light deflector 204 in FIG. 3. See FIG. 7 for the reflecting mirror 205). These elements are accommodated in a housing of the laser radar 20. In the present embodiment, the light emission system 201 is disposed on the +Z side of the light detection system 202.

Figure 4:
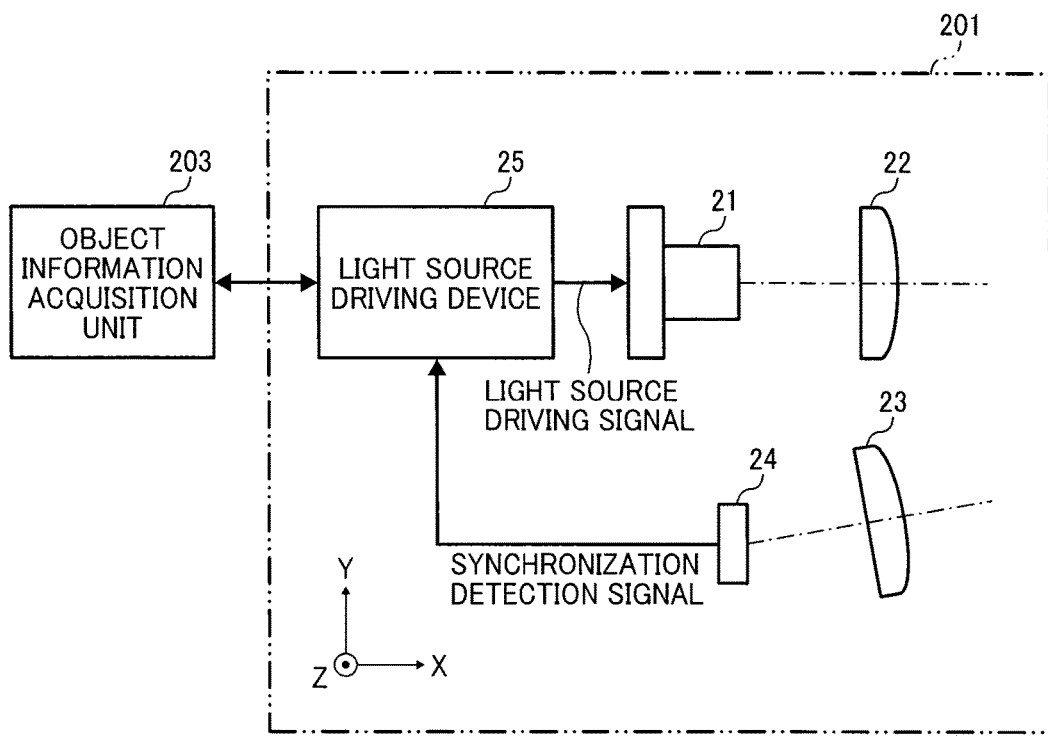
FIG. 4 is a diagram illustrating a light emission system according to an embodiment of the present invention.

FIG. 4 illustrates the light emission system 201 according to the present embodiment. As illustrated in FIG. 4, the light emission system 201 includes, for example, a light source 21, a coupling lens 22, a synchronous lens 23, a synchronization detection light detector 24, and a light source driving device 25.

In the present embodiment, the light source 21 is a semiconductor laser, and is switched on and switched off by the light source driving device 25. In the present embodiment, the light source 21 is disposed so as to emit light in the +X direction. In the following description, a signal that is sent from the light source driving device 25 to the light source 21 to drive the light source 21 is referred to as a light-source driving signal.

The coupling lens 22 is disposed on the +X side of the light source 21, and the coupling lens 22 makes the light emitted from the light source 21 become parallel light rays or diverging light that slightly diverges. In the present embodiment, a planoconvex lens is used as the coupling lens 22. The light that has passed through the coupling lens 22 is equivalent to the light that is emitted from the light emission system 201. Alternatively, the coupling lens 22 may be replaced with a coupling optical system with equivalent capability and a plurality of optical elements.

The synchronous lens 23 is disposed on the optical path of a synchronization detection light that enters the light emission system 201. The synchronization detection light will be described later in detail.

The synchronization detection light detector 24 is disposed at the focal point of the synchronization detection light that enters the light emission system 201 through the synchronous lens 23. The synchronization detection light detector 24 outputs a signal to the light source driving device 25 based on the amount of the received light. In the following description, a signal that is output from the synchronization detection light detector 24 to the light source driving device 25 may be referred to as a synchronization detection signal.

Figure 5:
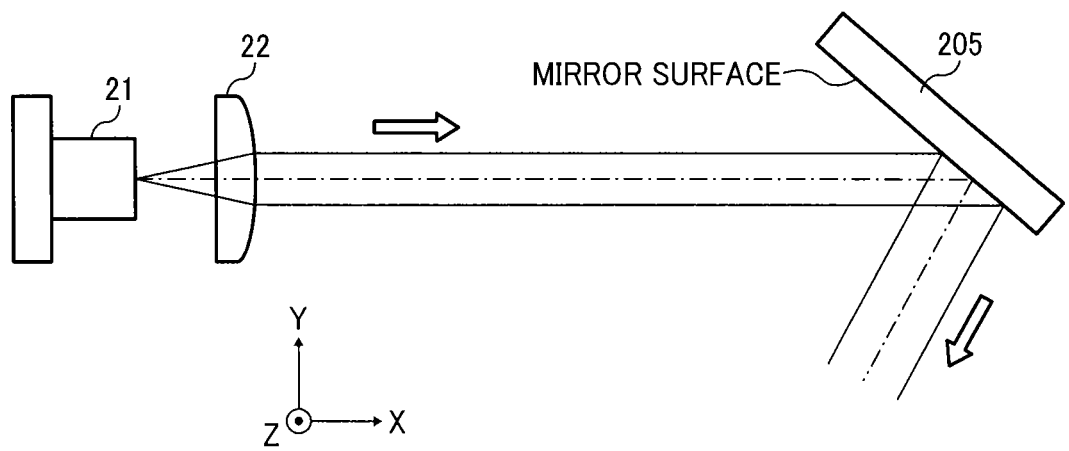
FIG. 5 is a diagram illustrating a reflecting mirror according to an embodiment of the present invention.

FIG. 5 is a diagram illustrating the reflecting mirror 205 according to the embodiment of the present invention. In the present embodiment, the reflecting mirror 205 is disposed on the +X side of the light emission system 201 and the light detection system 202. As illustrated in FIG. 5 for example, the reflecting mirror 205 reflects the light emitted from the light emission system 201 to the light deflector 204. The reflecting mirror 205 is provided to collapse the optical path, thereby contributing to the downsizing of the laser radar 20.

Figure 6:
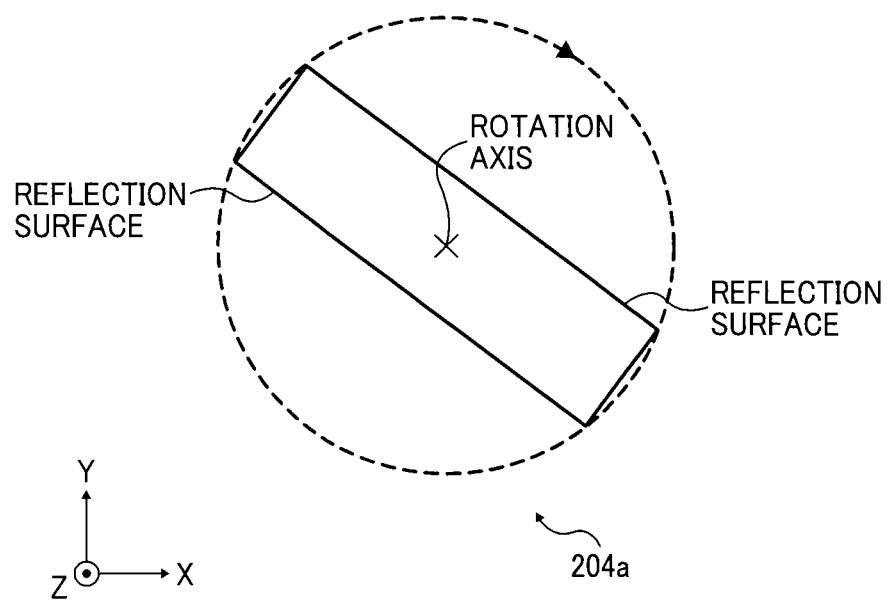
FIG. 6 is a diagram illustrating a rotating mirror of light deflector according to an embodiment of the present invention.

FIG. 6 is a diagram illustrating the rotating mirror 204a of the light deflector 204 according to the present embodiment. The light deflector 204 includes, for example, a rotating mirror 204a (see FIG. 6) that has two reflection planes and rotates on the rotation axis that is parallel to the Z axis, and a driving mechanism that drives the rotating mirror 204a to rotate. Such a driving mechanism is controlled by the object information acquisition unit 203. In the present embodiment, the rotating mirror 204a is designed to rotate in a clockwise direction when viewed from the +Z side. The reflection planes are parallel to the Z-axis direction.

Note that the number of the reflection planes of the rotating mirror 204a is not limited to two. For example, the number of the reflection planes of the rotating mirror 204a may be one, or three or more. Moreover, each of the two or more reflection planes may have a different tilt angle with reference to the rotation axis, and the scanning area may be switched with reference to the Z-axis direction.

Figure 7:
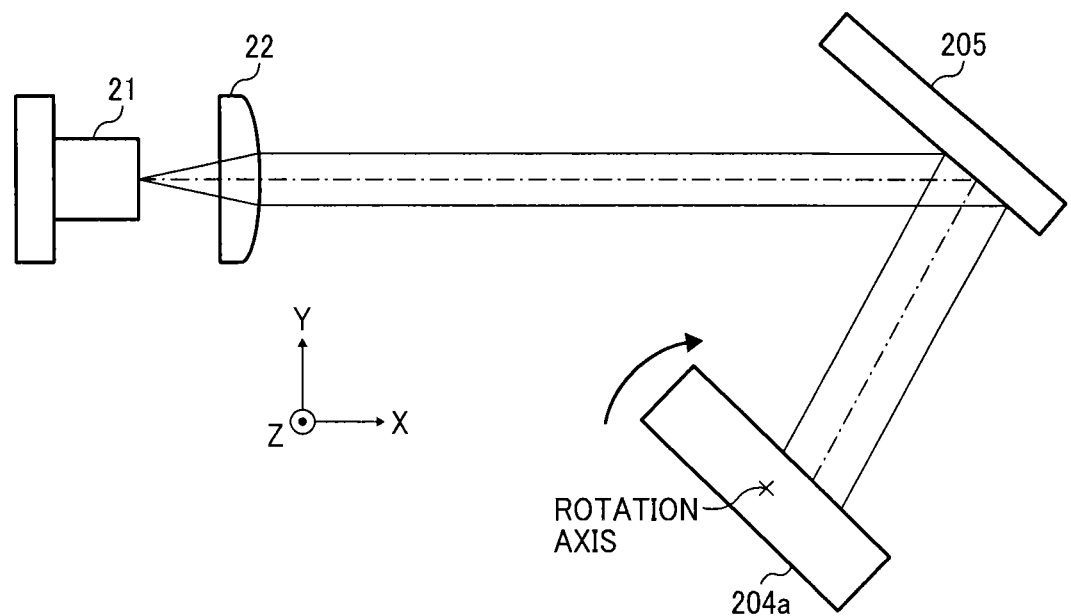
FIG. 7 is a diagram illustrating the relative positions of a reflecting mirror and a rotating mirror, according to an embodiment of the present invention.

FIG. 7 is a diagram illustrating the relative positions of the reflecting mirror 205 and the rotating mirror 204a, according to the present embodiment. As illustrated in FIG. 7, the rotating mirror 204a is disposed on the optical path of the light that is emitted from the light emission system 201 and then is reflected at the reflecting mirror 205. In other words, the light that is emitted from the light emission system 201 and then reflected at the reflecting mirror 205 is deflected by the light deflector 204.

Figure 8:
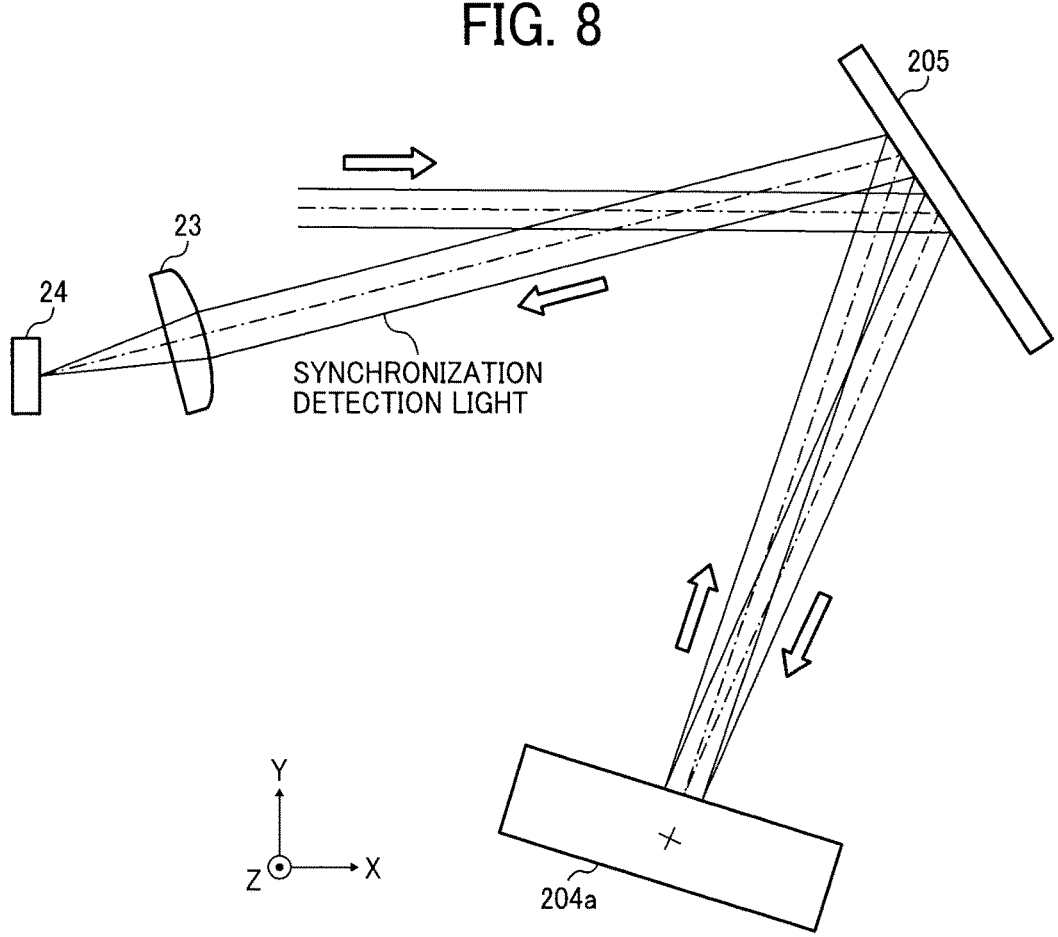
FIG. 8 is a diagram illustrating synchronization detection light according to an embodiment of the present invention.

FIG. 8 is a diagram illustrating a synchronization detection light according to the present embodiment. As illustrated in FIG. 8, for example, when the rotation angle of the rotating mirror 204a is at a prescribed angle, the light that is deflected by the light deflector 204 returns to the reflecting mirror 205 and is reflected at the reflecting mirror 205, and then is received at the synchronization detection light detector 24 through the synchronous lens 23. In the present embodiment, the light that is reflected at the reflecting mirror 205 is the synchronization detection light.

Further, as the rotating mirror 204a rotates, the light that is deflected by the light deflector 204 is directed to a detection area. In the following description, the light that is deflected by the light deflector 204 and is directed to the detection area may be referred to as detection light.

Figure 9:
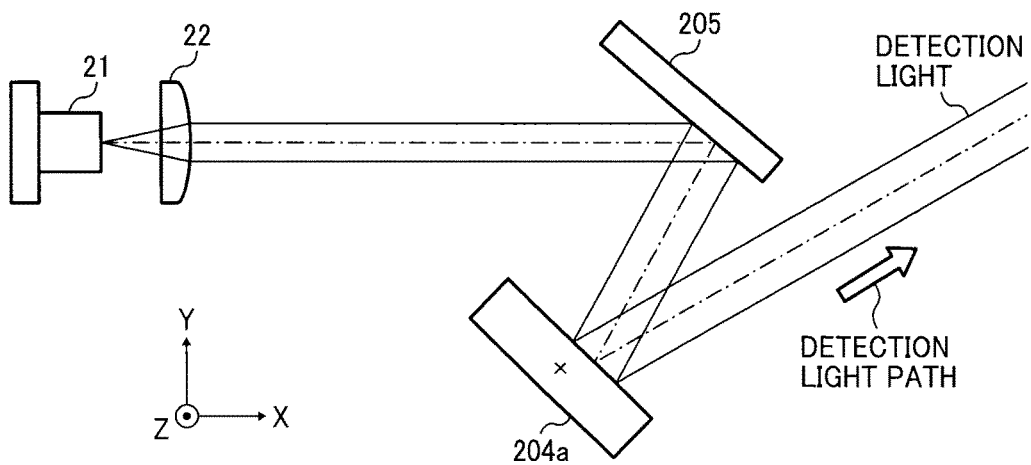
FIG. 9 is a diagram illustrating the detection light path according to an embodiment of the present invention (1).
Figure 10:
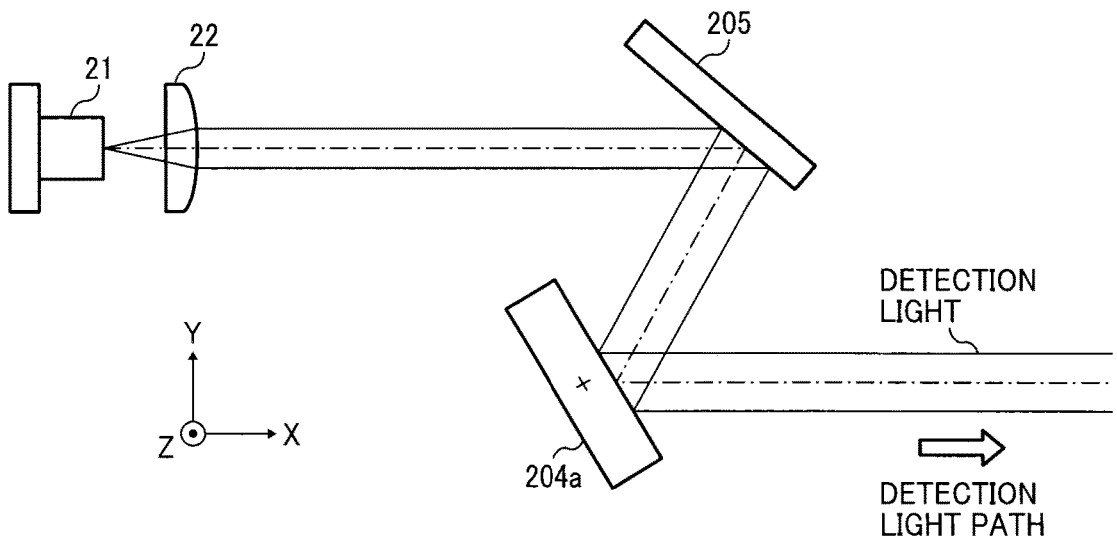
FIG. 10 is a diagram illustrating the detection light path according to an embodiment of the present invention (2).
Figure 11:
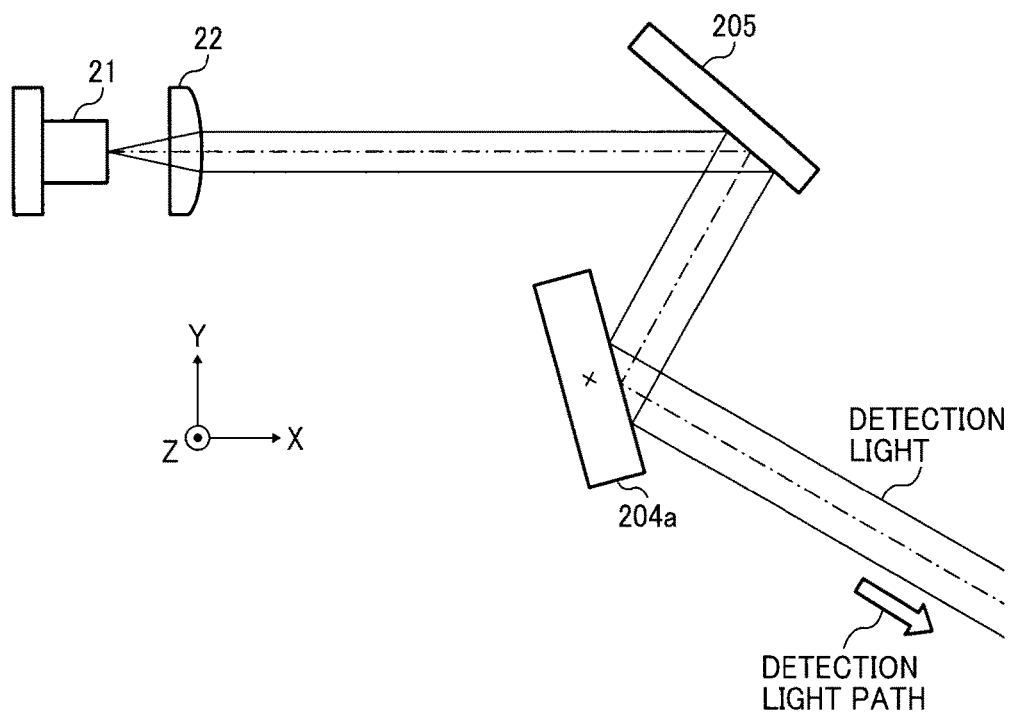
FIG. 11 is a diagram illustrating the detection light path according to an embodiment of the present invention (3).
Figure 12:
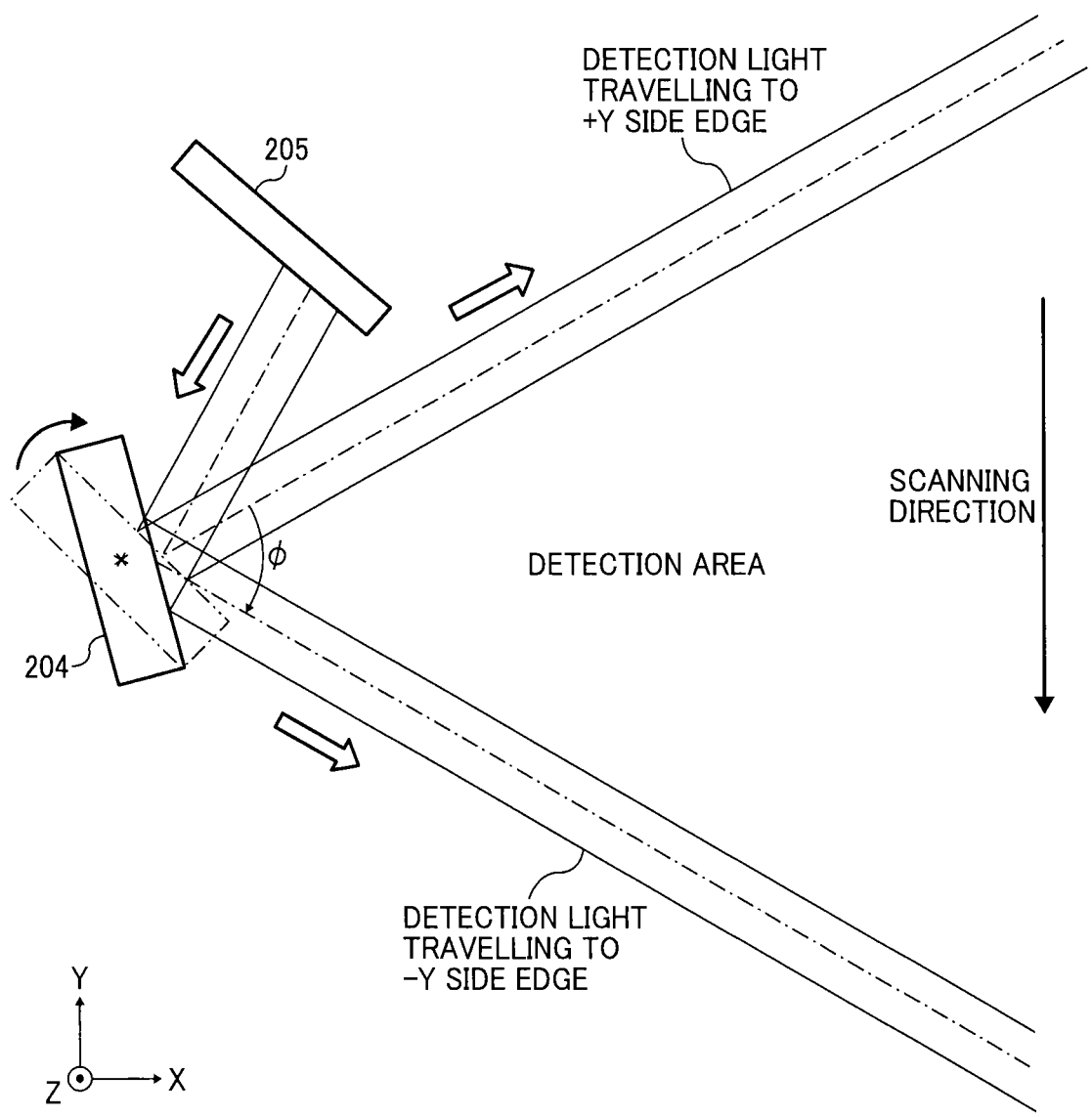
FIG. 12 is a diagram illustrating a detection area according to an embodiment of the present invention.

FIG. 9 to FIG. 11 are diagrams illustrating the detection light path, according to the present embodiment (1)-(3). FIG. 12 is a diagram illustrating a detection area according to the present embodiment.

As illustrated in FIG. 9 to FIG. 11, the detection light path changes on a plane orthogonal to the Z-axis direction, according to the rotation angle of the rotating mirror 204a. Accordingly, the detection area is scanned by the detection light in the −Y direction as the rotating mirror 204a rotates (see FIG. 12).

In the following description, the angle ϕ which the detection light path that is directed to an edge on the +Y side of the detection area forms with the detection light path that is directed to an edge on the −Y side of the detection area, on the plane orthogonal to the Z axis, may be referred to as a scanning angle (see FIG. 12). In other words, the detection area on the plane that is orthogonal to the Z-axis direction corresponds to the scanning area defined by the scanning angle ϕ (prescribed scanning area).

As described above, the synchronization detection light detector 24 and the detection area are sequentially scanned in a single scanning by one reflection plane of the rotating mirror 204a.

The light source driving device 25 uses two different methods for driving the light source 21. A first method is used when the light deflected by the light deflector 204 scans the synchronization detection light detector 24, and a second method is used when the light deflected by the light deflector 204 scans the detection area.

In the present embodiment, the light source driving device 25 drives the light source 21 to emit light continuously in the first driving method, and the light source driving device 25 drives the light source 21 to emit pulses of light in the second driving method.

In the present embodiment, it is assumed that the number of light-emitting pulses in the second driving method is N. The number of light-emitting pulses relates to the resolution (precision) of the position of an object in object detection. In the present embodiment, the light that is emitted by the first (1st) pulse light emission of the light source 21 in the second driving method is deflected by the light deflector 204, and then becomes the detection light that is directed to an edge on the +Y side of the detection area. The pulse of light that is emitted by the last (N-th) pulse light emission of the light source 21 in the second driving method is deflected by the light deflector 204, and then becomes the detection light that is directed to an edge on the −Y side of the detection area. Accordingly, the detection light path can be determined from the order of the pulse light emission (1st to N-th). For example, the pulse of light that is emitted by the ((N+1)/2)-th pulse light emission of the light source 21 in the second driving method is deflected by the light deflector 204, and then becomes the detection light that is directed to the center of the detection area (N is an odd number).

Figure 13:
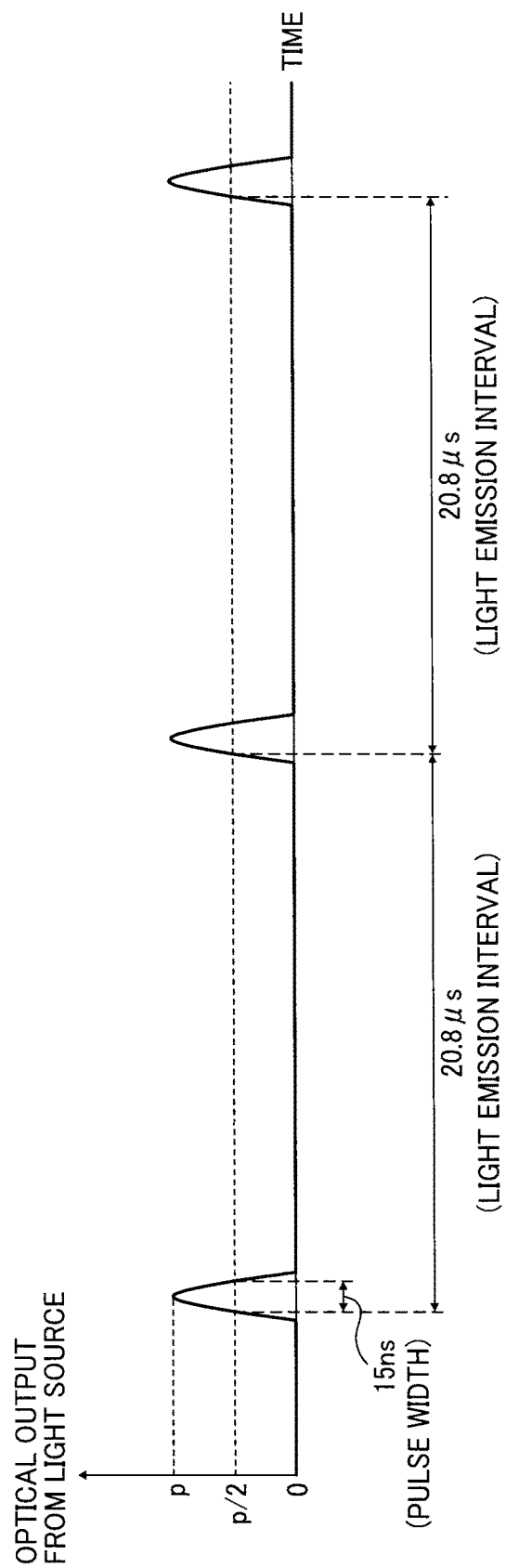
FIG. 13 is a diagram illustrating a second driving method according to an embodiment of the present invention.

FIG. 13 is a diagram illustrating the second driving method according to the present embodiment.

<First Setting>

In the pulse light emission according to the second driving method, the pulse width is configured to be equal to or less than 100 nanosecond (ns). In a first setting, power savings is achieved and the longevity of a semiconductor laser can be increased. In the first setting, the pulse width is set to the half value width of the optical output of the pulses of light emitted from the light source 21. Here, the pulse width is set to 15 ns by way of example (see FIG. 13).

<Second Setting>

In the pulse light emission according to the second driving method, the ratio of the pulse width to the light emission interval, i.e., the duty ratio, is configured to be equal to or less than 1 percent. In a second setting, even if a large electric current is passed through the semiconductor laser, the down time for heat dispersion lengthens. Accordingly, the effect of the generated heat can be reduced. Moreover, the strength of the light that is emitted from the semiconductor laser can be increased without degrading the semiconductor laser. As a result, the detectable distance can be extended.

In the second setting, the reference value of the light emission interval is set to 20.8 microsecond (μs) (see FIG. 13). In this configuration, the duty ratio is 0.072 percent. Note that the reference value of the light emission interval is calculated from, for example, the rotation speed of a rotating mirror, the scanning angle ϕ, and the number of light-emitting pulses.

<Third Setting>

Figure 14:
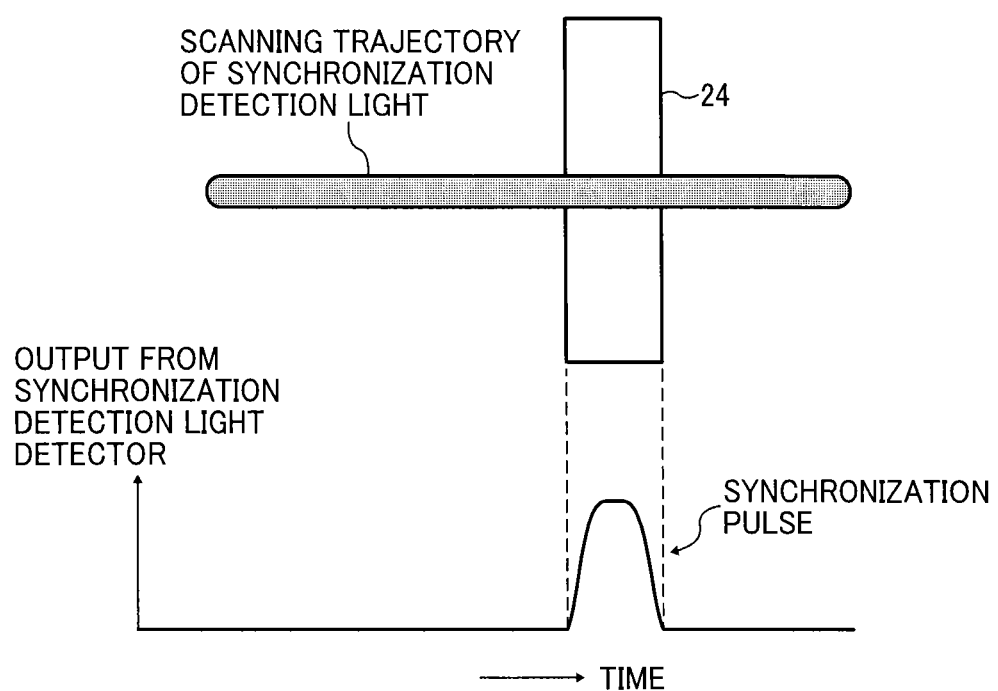
FIG. 14 is a diagram illustrating a first driving method according to an embodiment of the present invention.

FIG. 14 is a diagram illustrating the first driving method according to the present embodiment. In the continuous light emission according to the first driving method, the light emitting period is configured to be equal to or longer than 1 microsecond (μs). In such cases, as illustrated in FIG. 14 for example, the synchronization detection light can scan the synchronization detection light detector 24 without a break. The synchronization detection light detector 24 outputs a pulse based on the amount of the received light and the size of the light receiving area. In the following description, a pulse in a synchronization detection signal may be referred to as a synchronization pulse for the sake of explanatory convenience.

Figure 15A:
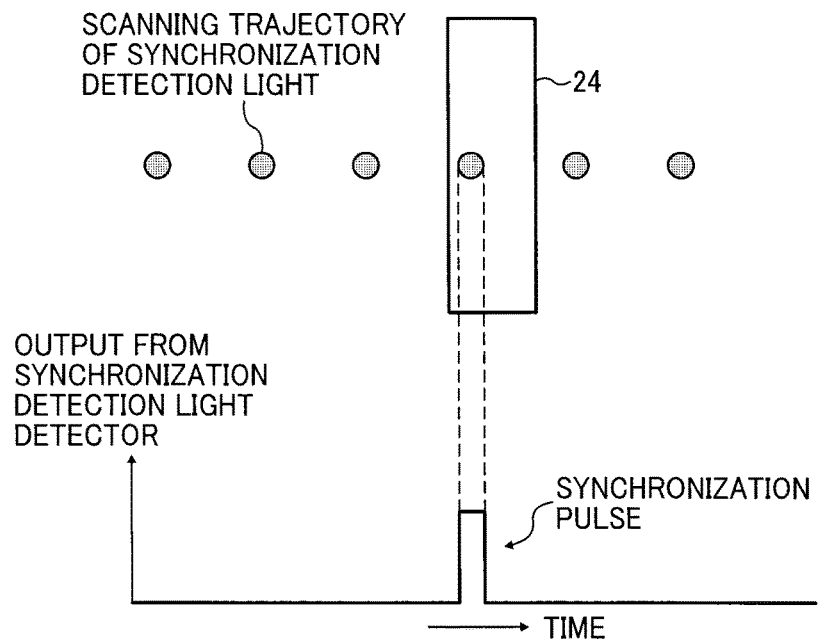
FIG. 15A and FIG. 15B are diagrams illustrating inconvenience caused when a first driving method is equivalent to a second driving method, according to an embodiment of the present invention.
Figure 15B:
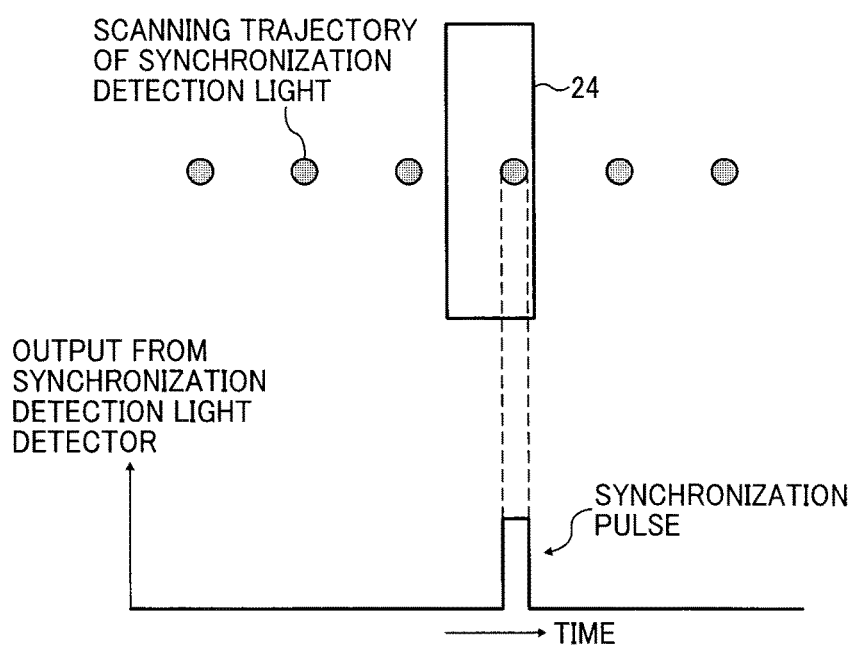

FIG. 15A and FIG. 15B are diagrams illustrating inconvenience caused when the first driving method is equivalent to the second driving method, according to the present embodiment. If the first driving method is equivalent to the second driving method, as illustrated in FIG. 15A and FIG. 15B for example, the timing at which the synchronization detection light detector 24 outputs a synchronization pulse varies and an error occurs in the start timing of scanning a detection area.

FIG. 16 is a diagram illustrating a synchronization detection signal according to the present embodiment. When a synchronization detection light is detected by the synchronization detection light detector 24 during a single scanning by a reflection plane, the synchronization detection light detector 24 outputs one synchronization pulse. Accordingly, the synchronization detection light detector 24 outputs synchronization pulses at regular intervals while the rotating mirror 204a is continuously rotating (see FIG. 16). In the present embodiment, the synchronization detection light detector 24 outputs a synchronization pulse every time the rotating mirror 204a rotates by half. In other words, the pulse signal that is synchronized with the rotation of the reflection plane of the rotating mirror 204a is a synchronization detection signal.

<Fourth Setting>

The peak value of the optical output of the light source 21 in the second driving method (such a peak value in the second driving method may be referred to as a second peak value in the following description) is set to be at least hundred-times greater than the peak value of the optical output of the light source 21 in the first driving method (such a peak value in the first driving method may be referred to as a first peak value in the following description).

If the first peak value is too great, the amount of the light received by the synchronization detection light detector 24 becomes too great. Accordingly, the signal output from the synchronization detection light detector 24 tends to be saturated, or the amount of unwanted light tends to increase. In such cases, the accuracy of the synchronous detection may deteriorate, or detection ends in failure. By contrast, if the second peak value is too small, the detectable distance tends to be too short.

For the above reasons, the second peak value is set to be at least a hundred times greater than the first peak value. Accordingly, the detectable distance can be extended without degrading the accuracy of the synchronous detection.

Figure 17:
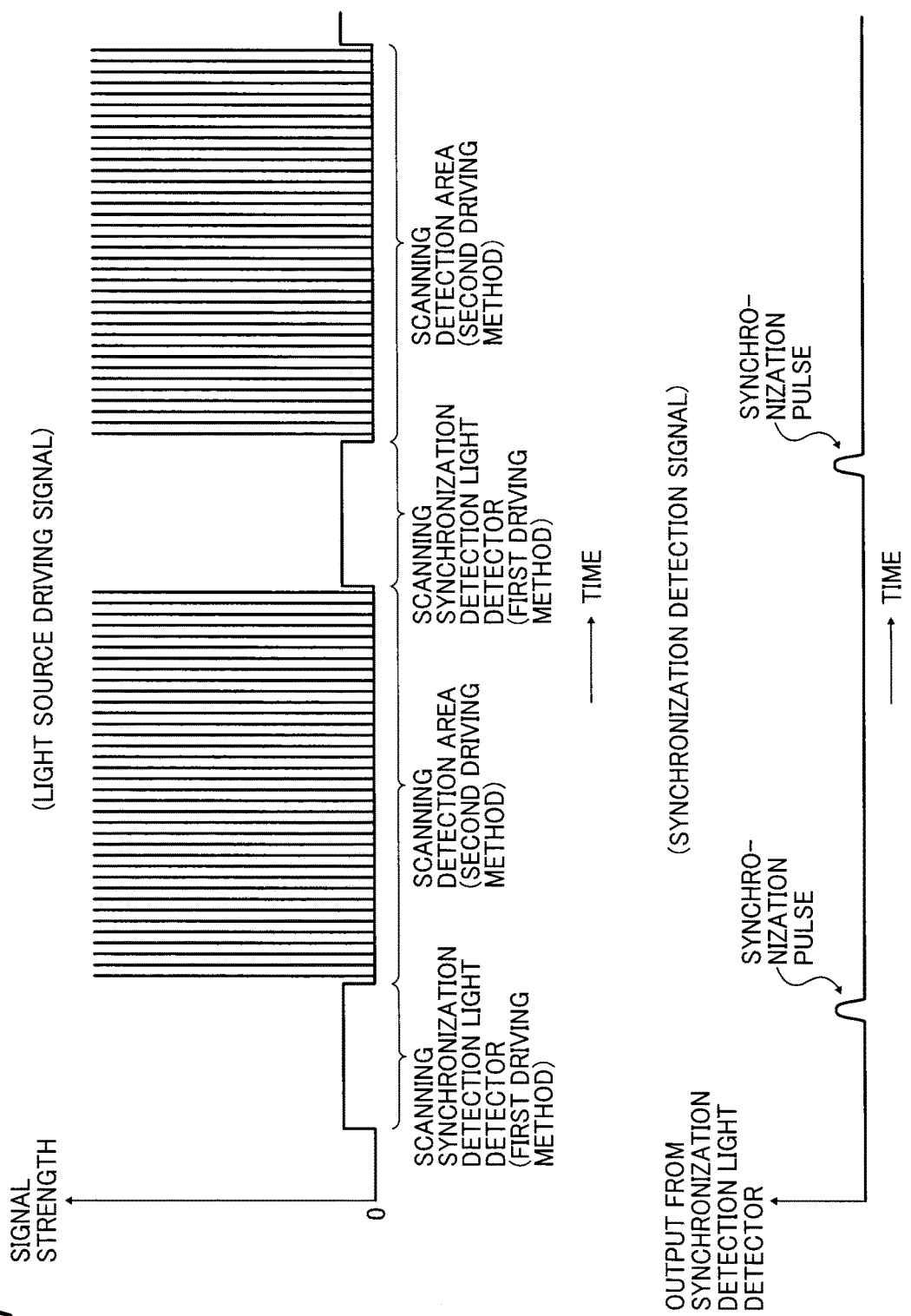
FIG. 17 is a diagram illustrating a light-source driving signal according to an embodiment of the present application.

FIG. 17 is a schematic diagram of an example of a light-source driving signal and synchronization detection signal according to the embodiment. Note that the relation between the optical output of the light source 21 and the signal strength of a light-source driving signal is determined in advance by experiment or the like, and that the first to fourth settings are satisfied.

Figure 18:
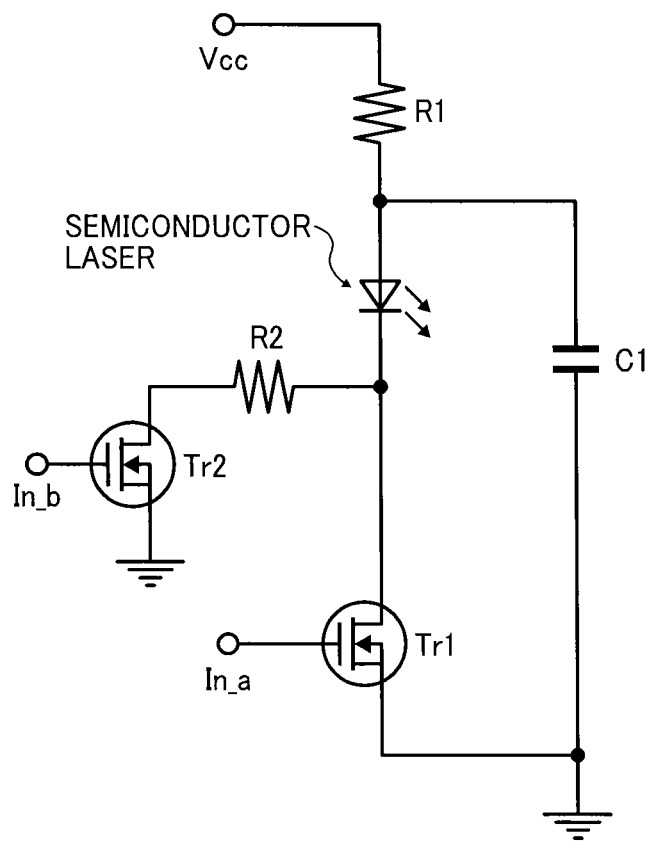
FIG. 18 is a circuit diagram illustrating an example of driver provided for a light source driving device according to an embodiment of the present application.

FIG. 18 illustrates an example of the driver provided for the light source driving device 25, according to the present embodiment. The driver that is provided for the light source driving device 25 includes a power source Vcc, a capacitor C1, resistors R1 and R2, and transistors Tr1 and Tr2. In the present embodiment, the voltage of the power source Vcc is 50 V, the resistances of the resistors R1 and R2 are 150Ω and 367Ω, respectively. Moreover, the capacitance of the capacitor C1 is 22 μF.

When the semiconductor laser is not to emit light, the transistor Tr1 is switched off. While the transistor Tr1 is switched off, the capacitor C1 is electrically charged by the power source Vcc.

In the second driving method, voltage is applied to In_a of FIG. 18. Accordingly, the transistor Tr1 is switched on, and the electric charge that is accumulated in the capacitor C1 momentarily flows through the semiconductor laser. As the resistance of the semiconductor laser is about a few ohms (Ω) in this configuration, the electric current that flows through the semiconductor laser is a few tens of amperes (A). As the electric charge accumulated in the capacitor C1 is limited, the semiconductor laser stops emitting light when the electric charge is dissipated. Due to this configuration, the semiconductor laser emits light with a high peak value and a short pulse width.

The electric current that is supplied from the power source Vcc flows through the semiconductor laser, but this electric current is about 0.333 A (50/150=0.333). Such a level of electric current is sufficiently smaller than the electric current supplied from the capacitor C1, and thus can be ignored.

In the first driving method, voltage is applied to In_b of FIG. 18. Accordingly, the transistor Tr2 is switched on, and the electric current that is supplied from the power source Vcc flows through the semiconductor laser. Then, the semiconductor laser keep emitting light until the voltage that is applied to In_b is turned off. The electric current that flows through the semiconductor laser in this configuration is about 0.097 A (50/(150+367)=0.097).

Right after the transistor Tr2 is switched on, the electric current that is supplied from the capacitor C1 (50/367=0.136 A) flows through the semiconductor laser. However, the electric charge that is accumulated in the capacitor C1 is limited. Accordingly, such an electric current from the capacitor C1 is used up instantly (on the order of a few tens of μseconds), and thus can technically be ignored.

In the present embodiment, the current path in which an electric current flows through the semiconductor laser and is grounded varies between the first driving method and the second driving method. Accordingly, a large electric current can instantly be generated in the second driving method, and a weak electric current can be generated for a longer time in the first driving method. Moreover, the driving circuit of the light source driving device 25 can be simplified.

Only the electric current that is supplied from the capacitor may be used in the second driving method, and only the electric current that is supplied from the power source may be used in the first driving method. However, in such cases, the circuitry tends to be complicated, and the size of the driving circuit tends to be large.

Figure 19A:
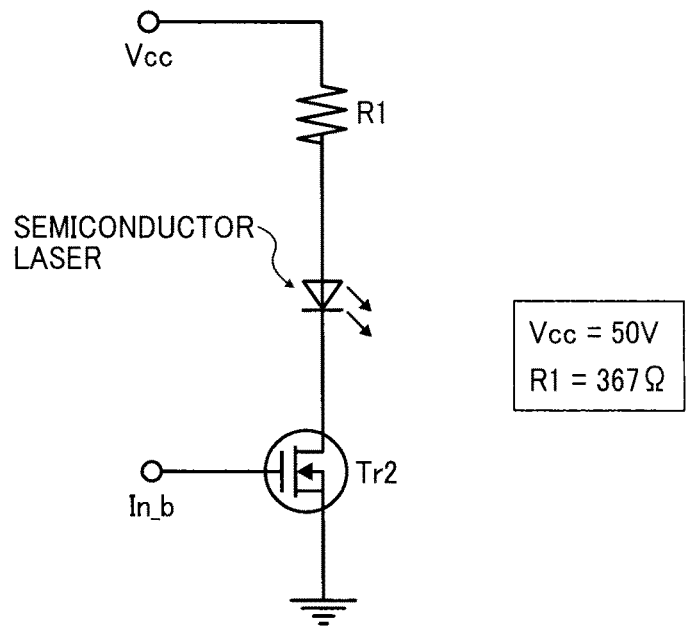
FIG. 19A is a circuit diagram illustrating an example of a driving circuit of a first driving method according to an embodiment of the present invention.
Figure 19B:
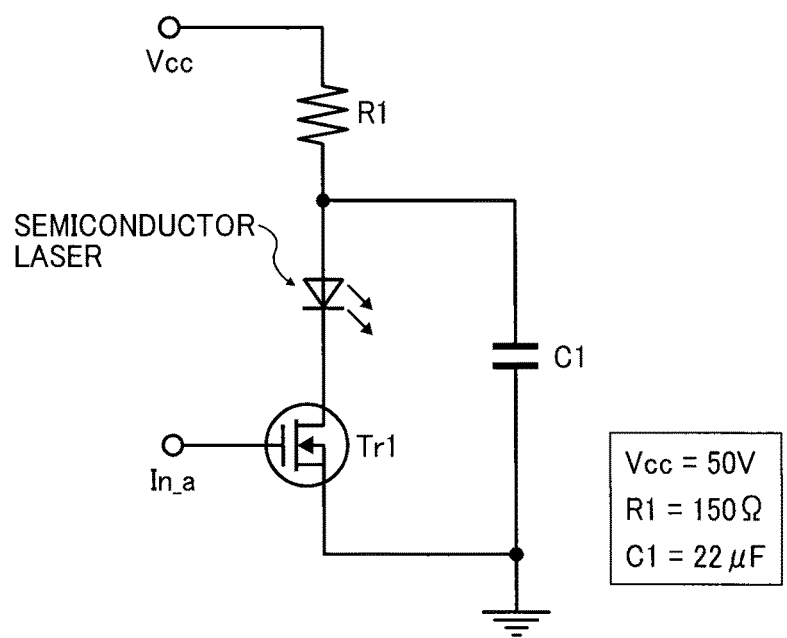
FIG. 19B is a circuit diagram illustrating an example of a driving circuit of a second driving method according to an embodiment of the present invention.

FIG. 19A and FIG. 19B are diagrams illustrating the driving circuit of the first driving method and the driving circuit of the second driving circuit, respectively, according to the present embodiment. If the driving circuit of the first driving method and the driving circuit of the second driving method are separately provided, the driving circuit illustrated in FIG. 19A and the driving circuit illustrated in FIG. 19B are provided, as an alternative to the one illustrated in FIG. 18.

Figure 20:
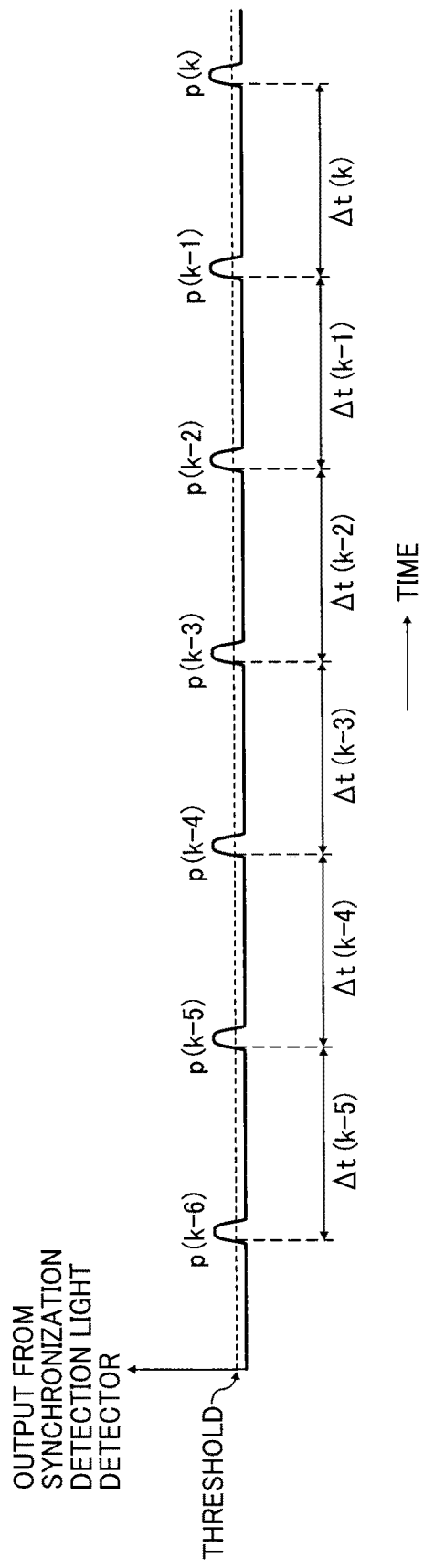
FIG. 20 is a diagram illustrating the impact of rotation jitter of a rotating mirror, according to an embodiment of the present invention.

FIG. 20 is a diagram illustrating the impact of rotation jitter of the rotating mirror 204a, according to the present embodiment. In the present embodiment, k-th synchronization pulse, (k-1)-th synchronization pulse, (k-2)-th synchronization pulse of the synchronization detection signal that are received by the light source driving device 25 since the object measurement has started are referred to as p(k), p(k-1), and p(k-2), respectively (see FIG. 20).

Moreover, the elapsed time between p(k-1) and p(k), the elapsed time between p(k-2) and p(k-1), and the elapsed time between p(k-3) and p(k-2) are referred to as $\Delta t(k)$, $\Delta t(k-1)$, and $\Delta t(k-2)$, respectively (see FIG. 20). In the following description, the elapsed time between two successive synchronization pulses may be referred to as a synchronization pulse interval for the sake of explanatory convenience.

Assuming that the rotating mirror 204a rotates with absolutely constant velocity and the reflection plane of the rotating mirror 204a is perfectly planar, all of the $\Delta t(k)$, $\Delta t(k-1)$, and $\Delta t(k-2)$ have the same value. However, when the rotating mirror 204a does not rotate with absolutely constant velocity or when the rotating mirror 204a has a plurality of reflection planes and there is an error in shape among the reflection planes, i.e., when the rotating mirror 204a has a rotation jitter, Δt(k), Δt(k-1), and Δt(k-2) do not have the same value and a slight difference arises thereamong. Accordingly, the scanning angle ϕ, i.e., the size of the detection area, varies for each time of scanning.

For this reason, in the present embodiment, the light source driving device 25 controls the variations in the size of the detection area as follows. Note that a reference value of the synchronization pulse interval is set to Δt. Moreover, a reference value of the light emission interval in the second driving method is set to Δtp.

<First Method>

The first method is used when the impact of the irregularities in rotation of the rotating mirror 204a is significant as a cause of the rotation jitter described above.

In the first method, when k-th scanning is to be performed, the light emission intervals in the second driving method are determined based on the immediately preceding synchronization pulse interval Δt(k).

For example, when the immediately preceding synchronization pulse interval Δt(k) is greater than Δt, it is considered that the rotation of the rotating mirror 204a became slow in some places in that interval. In such cases, the light emission interval in the second driving method is set to be greater than Δtp.

On the other hand, when the immediately preceding synchronization pulse interval Δt(k) is smaller than Δt, it is considered that the rotation of the rotating mirror 204a became fast in some places in that interval. In such cases, the light emission interval in the second driving method is set to be smaller than Δtp.

More specifically, when the synchronization pulse interval Δt(k) is greater than the reference value Δt by M percent, the light emission interval in the second driving method is set to be greater than Δtp by M percent. On the other hand, when the synchronization pulse interval Δt(k) is smaller than the reference value Δt by M percent, the light emission interval in the second driving method is set to be smaller than Δtp by M percent.

As described above, when the impact of the irregularities in rotation of the rotating mirror 204a is significant as a cause of the rotation jitter, the light emission intervals in the second driving method are determined based on the synchronization pulse interval that is immediately prior to the start of the scanning of the detection area. By so doing, even when the rotating mirror 204a has a rotation jitter, the precision of the size of the detection area improves.

<Second Method>

The second method is used when the impact of the misshapen reflection plane is significant as a cause of the rotation jitter described above.

In the second method, when k-th scanning is to be performed, the light emission intervals in the second driving method are determined based on the value of Δt(k-n+1), where the number of the reflection planes of the rotating mirror 204a is n (n is an integer equal to or greater than 2). For example, when n=2, the light emission intervals in the second driving method are determined based on the value of Δt(k-1).

More specifically, when the synchronization pulse interval Δt(k-n+1) is greater than the reference value Δt by M percent, the light emission interval in the second driving method is set to be greater than Δtp by M percent. On the other hand, when the synchronization pulse interval Δt(k-n+1) is smaller than the reference value Δt by M percent, the light emission interval in the second driving method is set to be smaller than Δtp by M percent.

<Third Method>

The third method is used when both the irregularities in rotation of the rotating mirror 204a and the impact of the misshapen reflection plane are considered to be causes of the rotation jitter described above.

In the third method, when k-th scanning is to be performed, the light emission intervals in the second driving method are determined based on the average of Δt(k-n+1) to Δt(k), where the number of the reflection planes of the rotating mirror 204a is n (n is an integer equal to or greater than 2). In other words, the light emission intervals in the second driving method are determined based on the average of the synchronization pulse intervals of a single rotation of the rotating mirror 204a.

More specifically, when the above average is greater than the reference value Δt by M percent, the light emission interval in the second driving method is set to be greater than Δtp by M percent. On the other hand, when the above average is smaller than the reference value Δt by M percent, the light emission interval in the second driving method is set to be smaller than Δtp by M percent.

As described above, the light emission intervals in the second driving method are determined based on an appropriate synchronization pulse interval, in view of the conditions of the caused rotation jitter. Accordingly, variations in the size of the detection area can be reduced.

In the above description, methods of controlling the variations in the size of the detection area caused by the jitter of the rotating mirror based on a synchronization pulse interval are described. In a similar manner, the starting point of the detection area also varies due to a jitter of the rotating mirror. The variations in such a starting point of the detection area can also be controlled in a similar manner to the above methods. More specifically, it is assumed that the elapsed time since a synchronization pulse is detected and until the detection starts is Δt_delay (in the following description, such an elapsed time will be referred to as a delay time). When the synchronization pulse interval Δt(k) is greater than the reference value Δt by M percent, Δt_delay is set to be greater than Δtp by M percent. On the other hand, when the synchronization pulse interval Δt(k) is smaller than the reference value Δt by M percent, Δt_delay is set to be smaller than Δtp by M percent.

Once a request for obtaining object information is received from the monitoring controller 40, the object information acquisition unit 203 drives the driving mechanism of the light deflector 204. Then, when the rotation speed of the rotating mirror 204a reaches a prescribed rotation speed, the object information acquisition unit 203 sends a request for starting driving the light source 21 to the light source driving device 25.

Then, once a request for stopping obtaining object information from the monitoring controller 40 is received, the object information acquisition unit 203 sends a request for stopping driving the light source 21 to the light source driving device 25.

Figure 21:
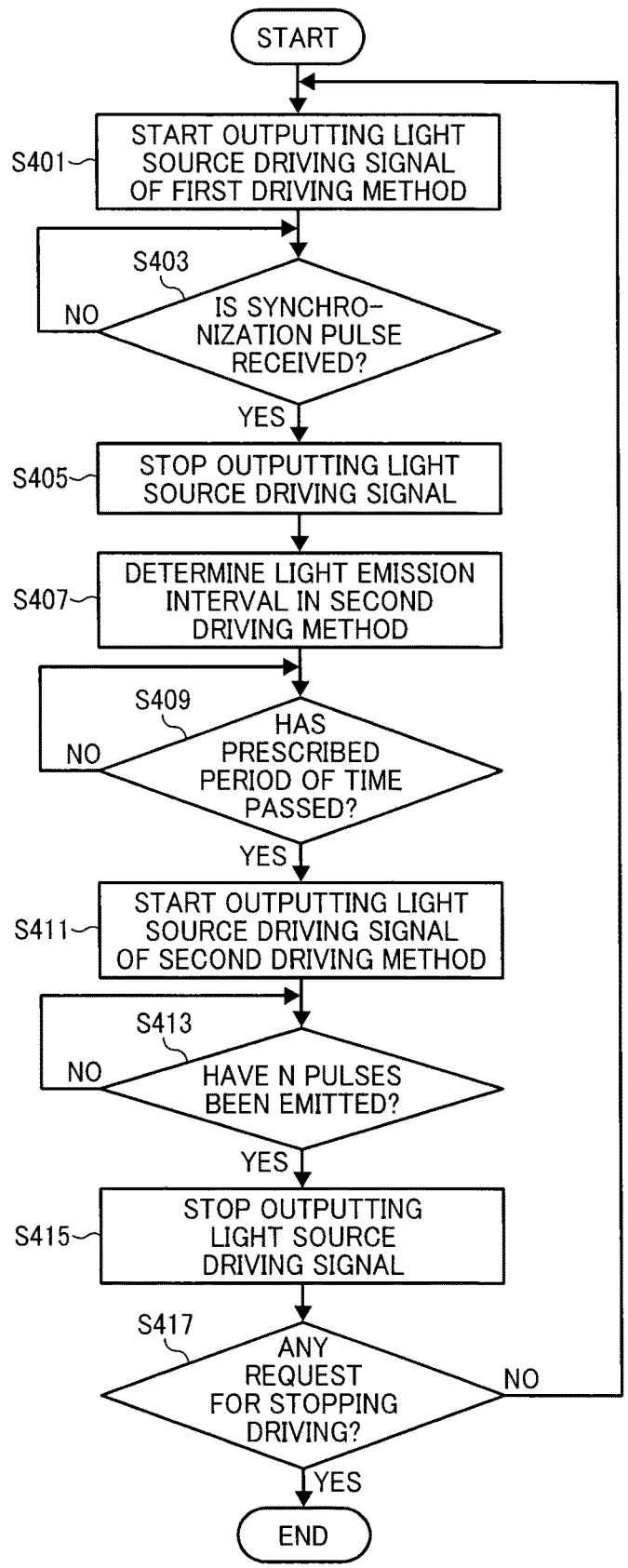
FIG. 21 is a flowchart of the processes performed by a light source driving device, according to an embodiment of the present invention.

FIG. 21 is a flowchart of a series of computational algorithms executed by the light source driving device 25, according to the present embodiment. Next, the light source driving processes performed by the light source driving device 25 when a request for starting driving the light source 21 is received from the object information acquisition unit 203 are described with reference to FIG. 21.

In the first step S401, the output of a light-source driving signal of the first driving method is started.

In the subsequent step S403, a synchronization detection signal is monitored and whether or not a synchronization pulse is received is determined. In step S403, it is determined that a synchronization pulse is received when the signal strength of a synchronization detection signal exceeds a prescribed threshold. When it is determined that a synchronization pulse is not received, the output of a light-source driving signal of the first driving method is maintained, and the process waits until a synchronization pulse is received. When a synchronization pulse is received, the determination in step S403 is affirmed and the process shifts to step S405.

In step S405, the output of the light-source driving signal is stopped.

In the following step S407, the light emission intervals in the second driving method are determined. In step S407, the light emission intervals are determined by using one of the first to third methods described above.

In the following step S409, the process waits and does not start until the elapsed time since a synchronization pulse was received reaches a prescribed length of time. When the elapsed time reaches the prescribed length of time, the process shifts to step S411.

In the following step S411, the output of a light-source driving signal of the second driving method is started. That is, the light source driving device 25 determines the timing at which the scanning of a detection area starts, based on the synchronization detection signal.

In the subsequent step S413, whether or not n pulses have been emitted is determined. When it is determined that N pulses of light have not yet been emitted, the output of a light-source driving signal of the second driving method is maintained, and the process waits until the N pulses of light have been emitted. When n pulses have been emitted, the determination in step S413 is affirmed and the process shifts to step S415.

In step S415, the output of the light-source driving signal is stopped.

In the subsequent step S417, whether or not any request for stopping driving the light source 21 has been received from the object information acquisition unit 203 is determined. When no such request for stopping driving has been received, the determination in step S417 is denied, and the process returns to the above step S401.

On the other hand, when such request for stopping driving has been received, the light source driving process ends.

When an object is present in the detection area, a part of the light that is emitted from the laser radar 20 and is reflected at the object returns to the laser radar 20. In the following description, the light that is reflected at the object and returns to the laser radar 20 may be referred to as "light reflected from an object", for the purpose of simplification.

The light reflected from an object is deflected by the light deflector 204 and directed to the reflecting mirror 205, and is reflected by the mirror 205 and enters the light detection system 202.

Figure 22:
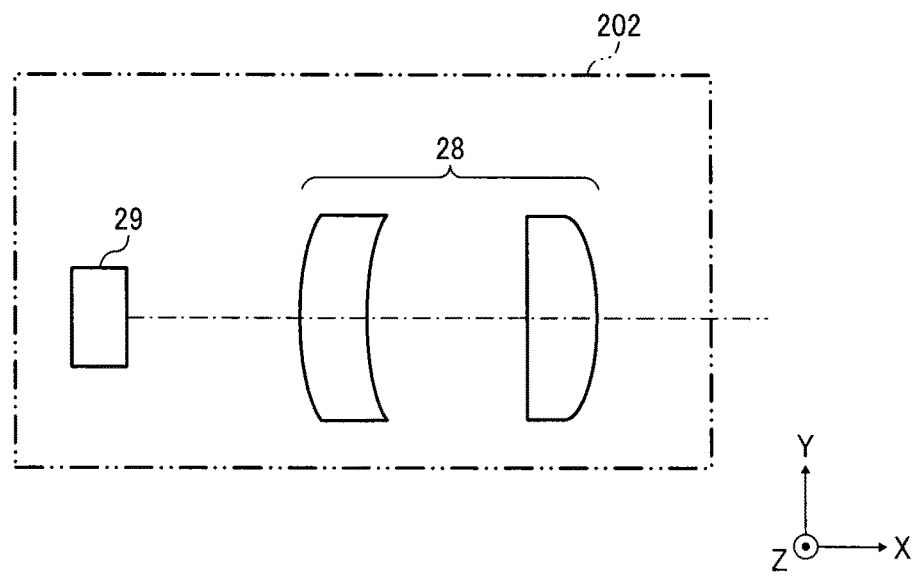
FIG. 22 is a diagram illustrating a light detection system according to an embodiment of the present invention.

As illustrated in FIG. 22, the light detection system 202 includes, for example, an imaging forming optical system 28 and a photosensor 29.

The imaging forming optical system 28 is disposed on the optical path of the light reflected from an object reflected by the reflecting mirror 205, and collects and condenses the light. In the present embodiment, the imaging forming optical system 28 is composed of two lenses. However, no limitation is intended thereby. For example, the imaging forming optical system 28 may be composed of a single lens, or the imaging forming optical system 28 may be composed of three or more lenses. Alternatively, the imaging forming optical system 28 may be a mirror optical system.

The photosensor 29 receives the light that has passed through the imaging forming optical system 28, and outputs a signal to the object information acquisition unit 203 according to the amount of the received light.

As a light receiving element of the photosensor 29, for example, a photodiode (PD), an avalanche photo diode (APD), and a single-photon avalanche diode (SPAD) (also known as a Geiger-mode APD (G-APD)) may be used. Note that an APD or a SPAD has higher sensitivity than a PD, and thus is advantageous in the accuracy of detection or the detectable distance.

The object information acquisition unit 203 determines that the photosensor 29 has received light reflected from an object when the output level of the photosensor 29 is equal to or greater than a prescribed threshold.

Figure 23:
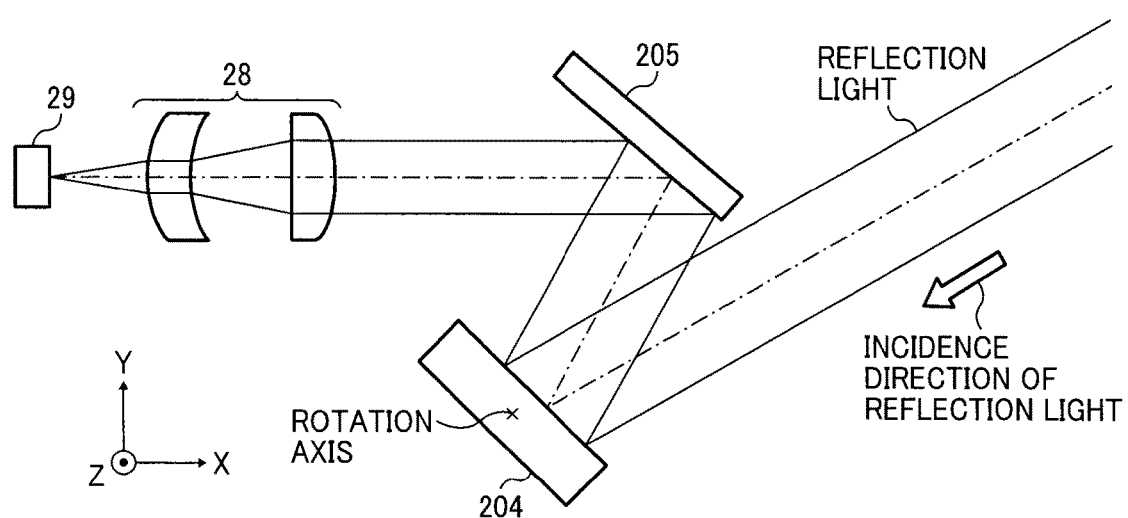
FIG. 23 is a diagram illustrating the incidence direction of light reflected from an object, according to an embodiment of the present invention (1).
Figure 24:
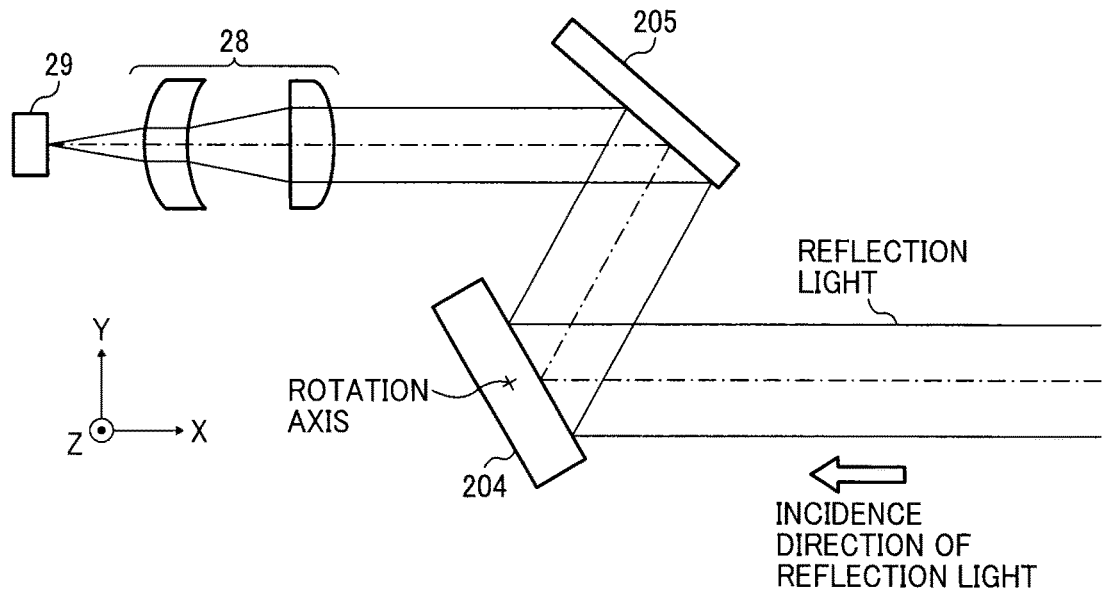
FIG. 24 is a diagram illustrating the incidence direction of light reflected from an object, according to an embodiment of the present invention (2).
Figure 25:
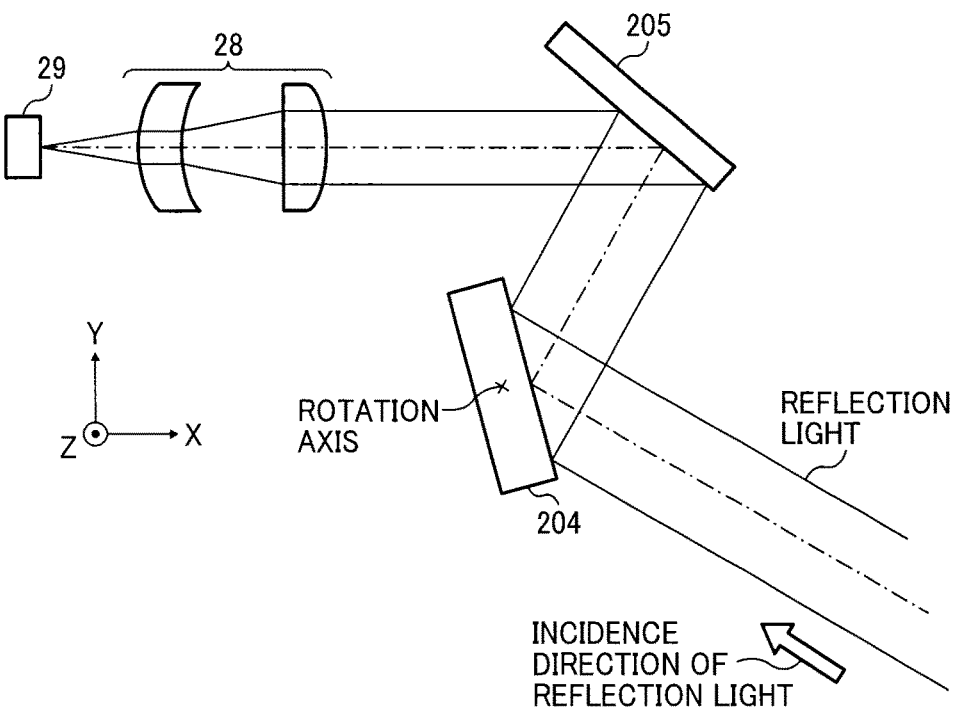
FIG. 25 is a diagram illustrating the incidence direction of light reflected from an object, according to an embodiment of the present invention (3).

When it is determined that the photosensor 29 has received the light reflected from an object, the object information acquisition unit 203 can refer to the incidence direction of light reflected from an object by referring to the order of the pulse light emission of the second driving method among the N times of pulse light emission (see FIG. 23 to FIG. 25).

Figure 26:
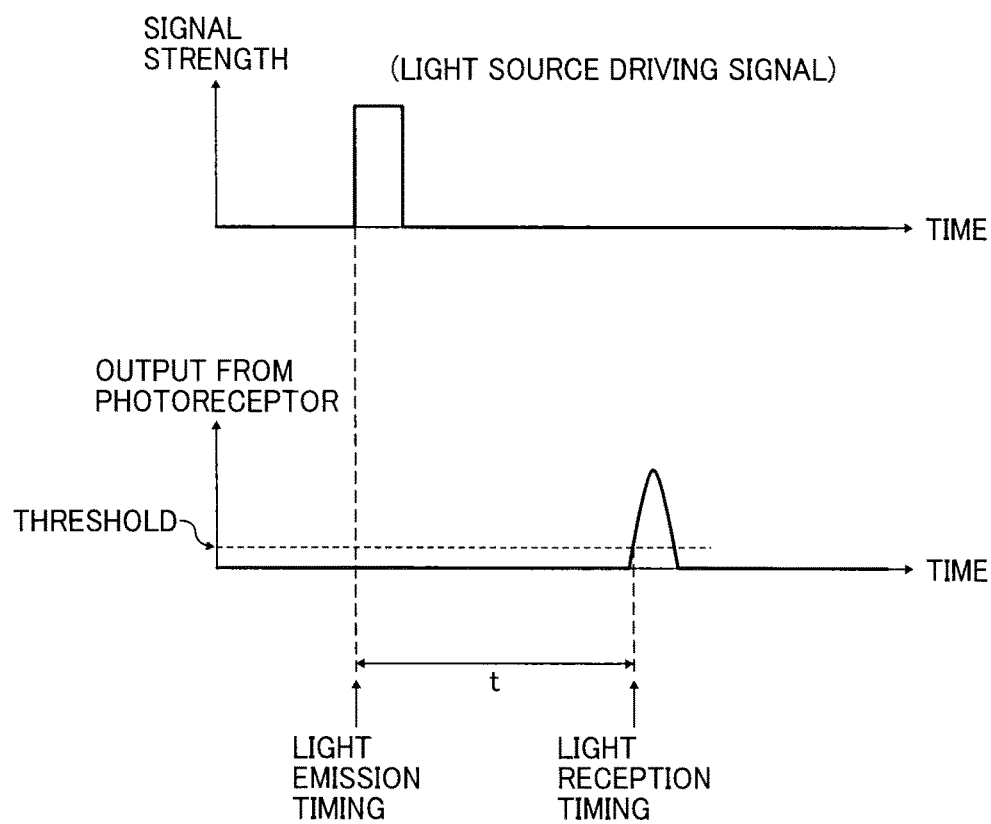
FIG. 26 is a diagram illustrating the measurement of the distance to an object performed by an object information acquisition unit, according to an embodiment of the present invention.

FIG. 26 is a diagram illustrating the measurement of the distance to an object performed by the object information acquisition unit 203, according to the present embodiment. When it is determined that the photosensor 29 has received light reflected from an object, as illustrated in FIG. 26 for example, the object information acquisition unit 203 calculates the distance to the object based on the elapsed time between the timing of light emission at the light source 21 and the timing of light reception at the photosensor 29.

Further, the object information acquisition unit 203 obtains object information such as the position, dimension, and shape of the object, and stores the obtained object information in the memory 50.

Even after a prescribed length of time has passed since light is emitted from the light source 21, the object information acquisition unit 203 determines that no object was detected as long as the output level of the photosensor 29 is smaller than a prescribed threshold, and stores the result of the determination in the memory 50.

As illustrated in FIG. 2, when there is an object ahead of the vehicle 1, the monitoring controller 40 determines whether or not the object has moved based on the object information stored in the memory 50, for every prescribed timing, and obtains the movement information of the object such as the moving direction and moving speed of the object when it is determined that the object has moved. Then, the monitoring controller 40 displays the object information and the movement information on the display 30.

Moreover, the monitoring controller 40 determines whether or not there is danger based on the object information and the movement information. When it is determined that there is danger, the monitoring controller 40 notifies the main controller of the vehicle 1 and the voice and alarm generator 60 of such danger.

Figure 27:
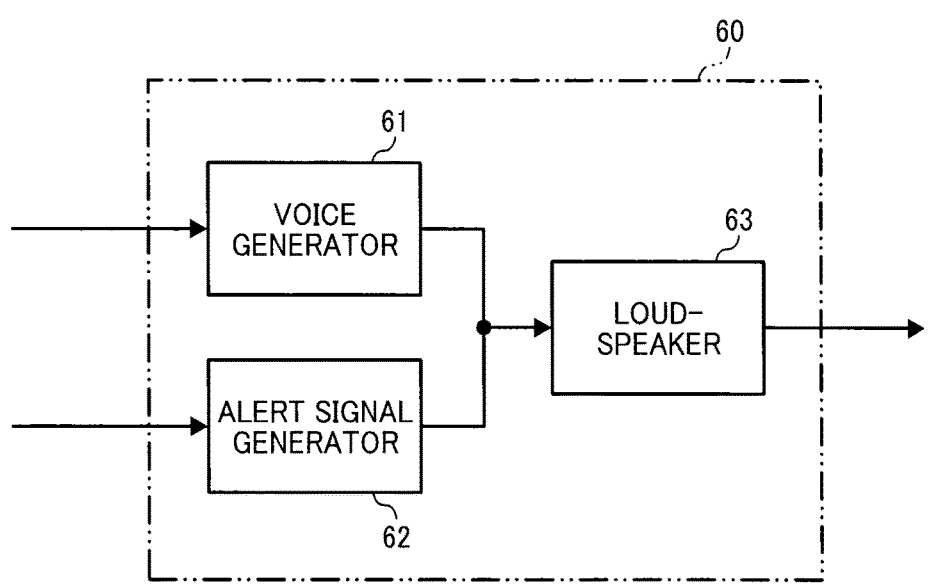
FIG. 27 is a block diagram illustrating the configuration of a voice and alarm generator according to an embodiment of the present invention.

FIG. 27 is a block diagram illustrating the configuration of the voice and alarm generator 60 according to the present embodiment. As illustrated in FIG. 27, the voice and alarm generator 60 includes, for example, a voice synthesizer 61, an alarm signal generator 62, and a loudspeaker 63.

The voice synthesizer 61 has a plurality of pieces of voice data, and when the presence of a danger is notified by the monitoring controller 40, the voice synthesizer 61 selects the corresponding piece of voice data and outputs the selected piece of voice data to the loudspeaker 63.

When the presence of danger is notified by the monitoring controller 40, the alarm signal generator 62 generates the corresponding alarm signal and outputs the selected alarm signal to the loudspeaker 63.

In the present embodiment, the light emission system 201 and the light detection system 202 are disposed in parallel in an overlapping manner in the Z direction, and the light deflector 204 and the reflecting mirror 205 are used by the light emission system 201 and the light detection system 202 in common. In such cases, the relative misregistration between the area of an object that is irradiated with the light from the light source 21 and the area of the photosensor 29 that can receive light can be reduced. Accordingly, stable object detection can be achieved.

As described above, in the present embodiment, the optical scanner according to an embodiment of the present invention includes the light emission system 201, the light deflector 204, and the reflecting mirror 205. The photosensor of the optical scanner according to an embodiment of the present invention is configured by the synchronization detection light detector 24. The light receiving device of the object detector according to an embodiment of the present invention is configured by the light detection system 202.

As described above, the laser radar 20 according to the present embodiment includes, for example, the light emission system 201, the reflecting mirror 205, the light deflector 204, the light detection system 202, and the object information acquisition unit 203.

As illustrated in FIG. 4, the light emission system 201 includes, for example, a light source 21, a coupling lens 22, a synchronous lens 23, a synchronization detection light detector 24, and a light source driving device 25. As illustrated in FIG. 22, the light detection system 202 includes, for example, an imaging forming optical system 28 and a photosensor 29.

The light source driving device 25 drives the light source 21 to emit light continuously using the first method when the light deflected by the light deflector 204 scans the synchronization detection light detector 24, and drives the light source 21 to emit pulses of light using the second method when the light deflected by the light deflector 204 scans the detection area. Accordingly, both downsizing of the devices and detecting the scanning position with high accuracy can be achieved.

In the pulse light emission according to the second driving method, the pulse width is configured to be equal to or less than 100 n and the duty is configured to be equal to or less than 1 percent. In such cases, power savings is achieved and the longevity of a semiconductor laser can be increased.

In the continuous light emission according to the first driving method, the light emitting period is configured to be equal to or longer than 1 microsecond ($\mu$s). The peak value of the optical output of the light source 21 in the second driving method is set to be at least hundred-times greater than the peak value of the optical output of the light source 21 in the first driving method. In such cases, the detectable distance of an object can be extended without degrading the accuracy of the synchronous detection.

The object information acquisition unit 203 acquires object information including the distance to the object, based on the timing of light emission at the light source 21 and the timing of light reception at the photosensor 29. According to the present embodiment, object information can accurately be acquired.

With the monitoring apparatus 10 according to the present embodiment, the provision of the laser radar 20 enables downsizing without harming the accuracy of detection of the object information and movement information.

In the embodiment described above, cases in which the pulse width in the second driving method is 15 ns were described. However, no limitation is indicated thereby. It is desired that the pulse width be equal to or shorter than 100 n.

In the embodiment described above, cases in which the duty ratio in the second driving method is 0.072 percent were described. However, no limitation is indicated thereby. It is desired that the duty ratio be equal to or shorter than 1 percent.

Figure 28:
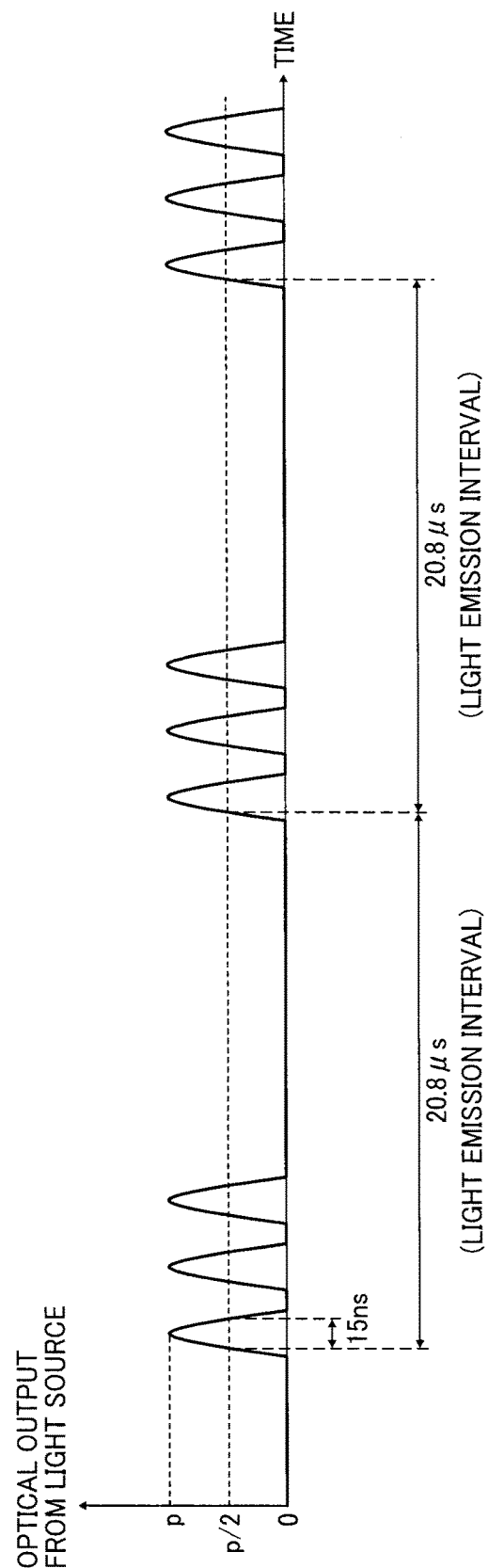
FIG. 28 is a diagram illustrating a modification of the second driving method.

FIG. 28 illustrates a modification of the second driving method according to the present example modification. In FIG. 28, three continuous pulse light emissions are performed (the pulse width of each of the pulse light emissions is 15 ns), and the light emission interval of such three continuous pulses is 20.8 microsecond ($\mu$s). The duty ratio in this configuration is 0.216 percent (=15 ns (pulse width)*3/20.8 $\mu$s), and this satisfies the condition of being equal to or less than 1 percent.

In the embodiments described above, the signal that is output from the synchronization detection light detector 24 changes from a low level to a high level when a synchronization detection light is received. However, no limitation is intended thereby. For example, the signal that is output from the synchronization detection light detector 24 may change from a high level to a low level when a synchronization detection light is received.

Figure 29:
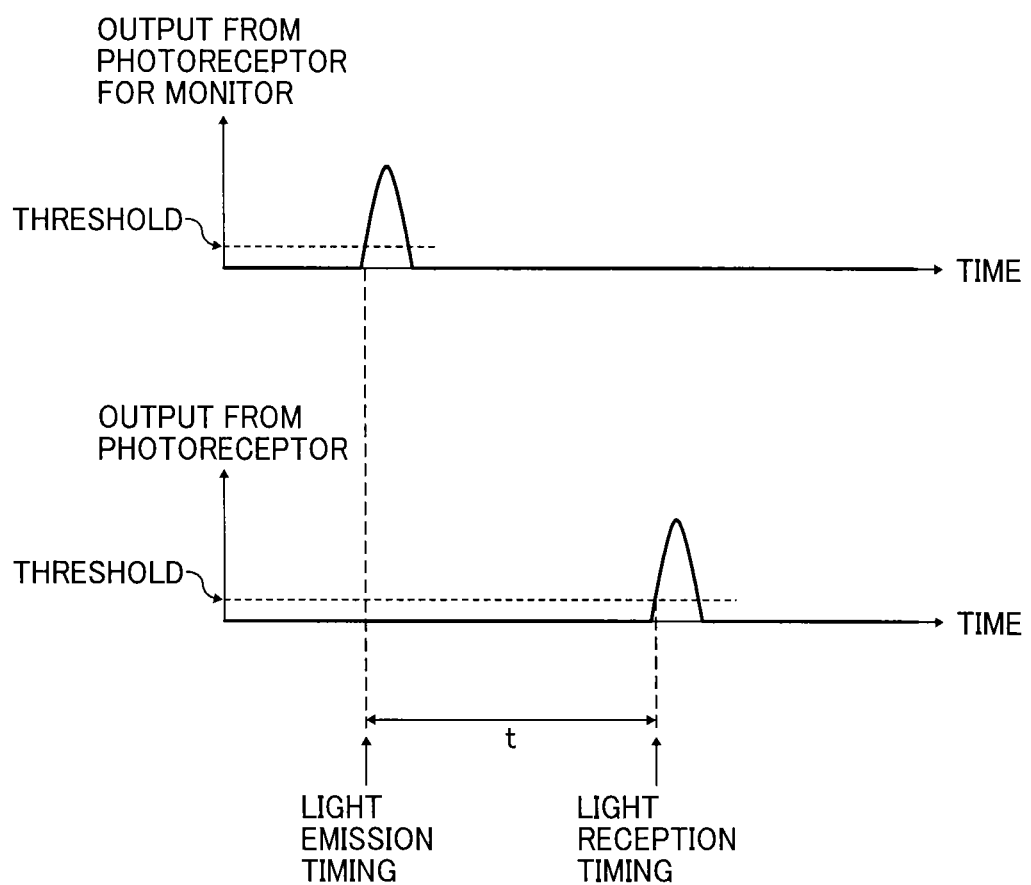
FIG. 29 is a diagram illustrating cases in which a photosensor for a monitor is provided, according to an embodiment of the present invention.

FIG. 29 is a diagram illustrating cases in which a photosensor for a monitor is provided, according to the present embodiment. In the embodiments described above, the light emission system 201 may include a photosensor for a monitor that receives a part of the light that is emitted from the light source 21 and then is reflected at the coupling lens 22, in order to measure the optical output of the light source 21. In such cases, as illustrated in FIG. 29 for example, the timing at which the output of the photosensor for a monitor exceeds a prescribed threshold may be set to the timing of light reception.

In such cases, the time t may be obtained by analog-to-digital (A/D) converting the output of the photosensor for a monitor and the output of the photosensor 29 and examining the correlation between the A/D converted output of the photosensor for a monitor and the A/D converted output of the photosensor 29.

In the embodiment described above, the light deflector 204 may be provided with a polygon mirror in place of the rotating mirror.

In the embodiments described above, cases in which the light emission system 200 is disposed on the +Z side of the light detection system 202 were described. However, no limitation is indicated thereby.

In the embodiments described above, the monitoring controller 40 may perform some of the processes of the object information acquisition unit 203, and the object information acquisition unit 203 may perform some of the processes of the monitoring controller 40.

In the embodiments described above, cases in which the monitoring apparatus 10 includes a single laser radar 20 were described. However, no limitation is indicated thereby. For example, the monitoring apparatus 10 may include a plurality of laser radars 20 according to the size of a vehicle or the monitoring area.

In the embodiments described above, cases in which the laser radar 20 is provided for the monitoring apparatus 10 that monitors the view in the traveling direction of the vehicle were described. However, no limitation is indicated thereby. For example, the laser radar 20 may be provided for an apparatus that monitors the rear view or side view of the vehicle.

The laser radar 20 may be provided for any device or apparatus other than vehicles to serve as a sensing apparatus. In such cases, the monitoring controller 40 outputs alarm information that meets the purposes of the sensing.

The laser radar 20 may be used only for detecting the presence of an object.

In particular, the laser radar 20 may be used, for example, for rangefinders or shape measuring apparatuses that are different from sensing apparatuses.

The optical scanner according to an embodiment of the present invention including the light emission system 201, the light deflector 204, and the reflecting mirror 205 may be used, for example, for an image display apparatus or an image forming apparatus that are different from the object detector.

Numerous additional modifications and variations are possible in light of the above teachings. It is therefore to be understood that within the scope of the appended claims, the disclosure of the present invention may be practiced otherwise than as specifically described herein. For example, elements and/or features of different illustrative embodiments may be combined with each other and/or substituted for each other within the scope of this disclosure and appended claims.

What is claimed is:

1. An optical scanner comprising:
   a light source configured to emit light;
   a light source driving device configured to drive the light source;
   a light deflector having at least one rotating reflection plane and configured to deflect the light emitted from the light source to a scanning area; and
   a light detector, which receives light from the light source deflected off of the light deflector, configured to output a signal to control a timing at which scanning of the scanning area by the light deflected by the light deflector starts,
   the light detector and the scanning area being sequentially scanned in a single scanning, during which the light deflector rotates, by one of the at least one rotating reflection plane of the light deflector,
   the light source driving device driving the light source using a first driving method when the light deflected by the light deflector scans the light detector, determining a timing at which the first driving method is switched to a second driving method that is different from the first driving method based on the signal output from the light detector, and driving the light source using the second driving method to scan the scanning area.

2. The optical scanner according to claim 1, wherein the light source driving device drives the light source to emit light continuously in the first driving method, and drives the light source to emit pulses of light in the second driving method.

3. The optical scanner according to claim 1, wherein the light source driving device includes a first current path that corresponds to the first driving method and a second current path that corresponds to the second driving method.

4. The optical scanner according to claim 3, wherein first electric current supplied to the light source through the first current path, and second electric current supplied to the light source through the second current path flow into different grounds.

5. The optical scanner according to claim 1, wherein a peak value of an optical output of the light source in the second driving method is set to be at least a hundred times greater than a peak value of an optical output of the light source in the first driving method.

6. The optical scanner according to claim 1, wherein the output signal of the light detector is a pulse signal that is synchronized with a rotation of the reflection plane of the light deflector, and the light source driving device determines a light emission interval in the second driving method based on the output signal of the light detector.

7. The optical scanner according to claim 6, wherein the light source driving device determines the light emission interval in the second driving method based on an immediately preceding pulse interval in the output signal of the light detector.

8. The optical scanner according to claim 6, wherein
   the light deflector has n reflection planes, where n is an integer equal to or greater than 2, and
   the light source driving device determines the light emission interval in the second driving method based on a n-th previous pulse interval in the output signal of the light detector.

9. The optical scanner according to claim 6, wherein
   the light deflector has n reflection planes, where n is an integer equal to or greater than 2, and
   the light source driving device determines the light emission interval in the second driving method based on an average of from a n-th previous pulse interval to an immediately preceding pulse interval in the output signal of the light detector.

10. An object detector comprising:
    the optical scanner according to claim 1, and
    a light receiving device configured to receive light that is emitted from the optical scanner to a scanning area and is reflected at an object when the object is placed within the scanning area.

11. The object detector according to claim 10, wherein in the second driving method, the light source driving device of the optical scanner drives the light source to emit pulses of light with a duty ratio equal to or less than 1 percent.

12. The object detector according to claim 10, wherein
    in the first driving method, the light source driving device of the optical scanner drives the light source to emit light continuously for equal to or longer than 1 μs, and
    in the second driving method, the light source driving device of the optical scanner drives the light source to emit pulses of light with a pulse width of equal to or shorter than 100 ns.

13. A sensing apparatus comprising:
    the object detector according to claim 10; and
    a monitoring controller configured to determine whether or not an object is present, and obtain at least one of position and speed of the object, based on the output signal from the object detector.

14. The sensing apparatus according to claim 13, wherein
    the sensing apparatus is mounted on a vehicle, and
    the monitoring controller determines whether or not there is danger based on at least one of information on position and movement of the object.

* * * * *